United States Patent
Nagumo

(10) Patent No.: US 9,826,588 B2
(45) Date of Patent: Nov. 21, 2017

(54) LIGHT-EMISSION DRIVE CIRCUIT AND IMAGE FORMING APPARATUS

(71) Applicant: Oki Data Corporation, Tokyo (JP)

(72) Inventor: Akira Nagumo, Takasaki (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/050,403

(22) Filed: Feb. 22, 2016

(65) Prior Publication Data
US 2016/0295651 A1 Oct. 6, 2016

(30) Foreign Application Priority Data
Mar. 31, 2015 (JP) .................................. 2015-071724

(51) Int. Cl.
*H02M 3/156* (2006.01)
*H05B 33/08* (2006.01)

(52) U.S. Cl.
CPC ............................... *H05B 33/0842* (2013.01)

(58) Field of Classification Search
CPC ................ H05B 33/0842; H02M 3/156–3/158
USPC .................................................. 363/282–290
See application file for complete search history.

(56) References Cited

U.S. PATENT DOCUMENTS

| 5,351,217 A * | 9/1994 | Jeon ........................ G11C 8/08 326/106 |
| 7,110,274 B1 * | 9/2006 | Endo ..................... G09G 3/3611 327/534 |
| 2008/0309163 A1 * | 12/2008 | Hashimoto ........... H02J 7/0029 307/31 |
| 2010/0110801 A1 * | 5/2010 | Song ...................... G11C 5/143 365/189.05 |

FOREIGN PATENT DOCUMENTS

JP     2012-156448 A     8/2012

* cited by examiner

*Primary Examiner* — Yemane Mehari
(74) *Attorney, Agent, or Firm* — Rabin & Berdo, P.C.

(57) ABSTRACT

Provided is a light-emission drive circuit that includes a power supply and a pull-up circuit. The power supply is configured to generate a voltage that is higher than a voltage in a controller. The controller is configured to supply a control signal that drives a light-emitting section. The pull-up circuit is provided between the power supply and an input terminal of the light-emission drive circuit, and includes a switching section configured to be turned on when a voltage of the input terminal is lower than a predetermined voltage. The predetermined voltage is lower than the voltage of the power supply.

17 Claims, 26 Drawing Sheets

LIGHT-EMISSION DRIVE CIRCUIT AND IMAGE FORMING APPARATUS

CROSS REFERENCE TO RELATED APPLICATIONS

This application claims the benefit of Japanese Priority Patent Application JP2015-071724 filed on Mar. 31, 2015, the entire contents of which are incorporated herein by reference.

BACKGROUND

The invention relates to a light-emission drive circuit that drives a light-emitting section, and to an image forming apparatus that includes the light-emission drive circuit.

An image forming apparatus such as, but not limited to, an electrophotographic printer includes an exposure section in which a plurality of light-emitting elements are arrayed. The exposure section may be configured by an LED head in a case where light-emitting diodes (LEDs) are used for the light-emitting elements. The LED head includes a driver IC serving as a drive circuit that drives the LEDs.

The driver IC and a printed circuit board that mounts the driver IC are coupled to each other through a bonding wire. The driver IC used for the LED head may include a strobe terminal that has a pull-up device to prevent any LED from being always turned on under circumstances where the bonding wire comes off and thus the driver IC becomes uncontrollable. For example, reference is made to Japanese Unexamined Patent Application Publication No. 2012-156448.

SUMMARY

A pull-up device of a strobe terminal is typically a resistor that utilizes impurity diffusion or a polysilicon material, or typically utilizes on-resistance of a PMOS transistor. In each case, an open voltage of the strobe terminal is 5 V which is substantially equal to a supply voltage of a driver IC. In such a situation, a supply voltage of an LSI device used for an LED head control section that controls an LED head is typically 3.3 V. One concern is that a current thus occurs from the 5 V power supply side to the 3.3 V power supply side of the LSI device through the strobe terminal, thereby causing a latch-up trigger current on the LSI device side and its consequential latch-up breakage. Another concern is that, to prevent the concern mentioned above, it is necessary to provide a buffer device at a mid-course position of a signal path between the LSI device and the driver IC, thereby increasing manufacturing costs.

It is desirable to prevent a latch-up breakage without increasing manufacturing costs.

A light-emission drive circuit according to an illustrative embodiment of the invention includes: a power supply configured to generate a voltage that is higher than a voltage in a controller, in which the controller is configured to supply a control signal that drives a light-emitting section; and a pull-up circuit provided between the power supply and an input terminal of the light-emission drive circuit, and including a switching section configured to be turned on when a voltage of the input terminal is lower than a predetermined voltage. The predetermined voltage is lower than the voltage of the power supply.

DETAILED DESCRIPTION

In the following, some example embodiments of the invention are described in detail with reference to the accompanying drawings. Note that the following description is directed to illustrative examples of the invention and not to be construed as limiting to the invention. Also, factors such as arrangement, dimensions, and a dimensional ratio of elements illustrated in each drawing are illustrative only and not to be construed as limiting to the invention.

First Example Embodiment

In the following description, a light-emitting diode, a monolithic integrated circuit, an N-channel MOS (Metal Oxide Semiconductor) transistor, and a P-channel MOS transistor may respectively be referred to as LED (Light-Emitting Diode), IC (Integrated Circuit), NMOS, and PMOS.

Also, a "High" signal level and a "Low" signal level may be described as corresponding respectively to a logical value of "1" and a logical value of "0", irrespective of a positive logic and a negative logic.

Further, where there is a necessity to define a signal logic, "–P" may be added to the end of any signal name to denote that the signal is a positive logic signal, or "–N" may be added to the end of any signal name to denote that the signal is a negative logic signal.

In addition, electrostatic latent images formed on a photosensitive drum by light emission of respective light-emitting elements each may be referred to as a "dot". Toner images following development or having been transferred onto a print medium each may also be referred to as a "dot". Similarly, the light-emitting elements corresponding to such respective dots each may also be referred to as a "dot".

As used herein, the term "medium" may refer to paper or any other medium on which an image is to be formed.

The term "LED head" as used herein is a generic term of a unit in which light-emitting elements, drive elements thereof, and any other element are disposed. The following description is directed, without limitation, to some example embodiments in which a group of driven elements is a line of LEDs used for an electrographic printer.

An electrographic printer, serving as a non-limiting example of an image forming apparatus, may selectively irradiate an electrostatically-charged photosensitive drum with light in accordance with print information to thereby form an electrostatic latent image. The electrographic printer may further cause a toner to be attached to the thus-formed electrostatic latent image to form a toner image, and may transfer the toner image onto a medium and fix the toner image to the medium.

Figure 1:
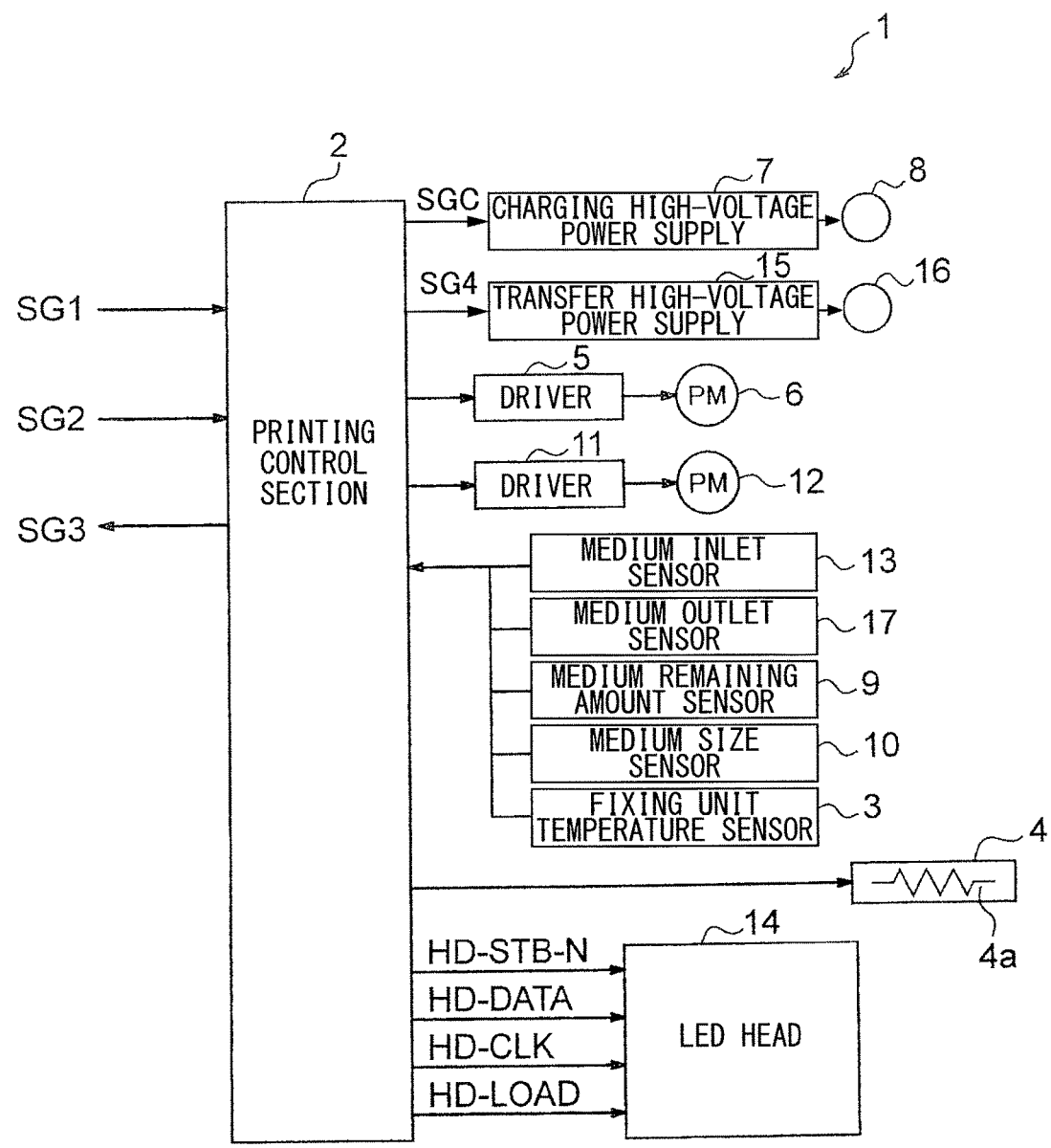
FIG. 1 is a block diagram illustrating a printer control circuit in an electrophotographic printer according to a first example embodiment.

FIG. 1 is a block diagram illustrating a printer control circuit 1 in the electrophotographic printer according to a first example embodiment.

A reference numeral 2 denotes a printing control section that may include a microprocessor, ROM, RAM, input-output ports, a timer, and any other element. The printing control section 2 may be a controller disposed inside a printing section of the printer, and that performs a sequence control of the printer as a whole to perform a printing operation. The sequence control may be performed based on a control signal SG1, a video signal SG2, and any other signal supplied from an unillustrated image processing section. The video signal SG2 may be a one-dimensional array of dot map data.

For example, upon receiving instructions on printing given through the control signal SG1, the printing control section 2 may first detect, with use of a fixing unit temperature sensor 3, whether a fixing unit 4 is in a useable temperature range. The fixing unit 4 may be provided therein with a heater 4a. The printing control section 2 may perform electric conduction of the heater 4a when the fixing unit 4 is out of the temperature range to heat the fixing unit 4 to a usable temperature.

Then, the printing control section 2 may rotate a development-transfer process motor (denoted as PM) 6 through a driver 5 and may at the same time turn on a charging high-voltage power supply 7 through a charge signal SGC to perform charging of a developing unit 8.

Also, a presence of unillustrated medium and a type of the medium set in the electrographic printer may respectively be detected by a medium remaining amount sensor 9 and a medium size sensor 10 to start medium feeding that is suitable for the set medium. A medium feeding motor (denoted as PM) 12 may be coupled to a planetary gear mechanism, making it possible to rotate the medium feeding motor 12 bi-directionally through a driver 11 and thereby to selectively drive, by changing directions of rotation of the motor, various different medium feeding rollers in the printer.

The printing control section 2 may first rotate the medium feeding motor 12 in reverse each time the printing of one page is started, to feed the set medium by a predetermined amount until a medium inlet sensor 13 detects the medium. Then, the printing control section 2 may rotate the medium feeding motor 12 in positive rotation to convey the medium into a printing mechanism inside the printer.

The printing control section 2 may, upon traveling of the medium to a printable position, send a timing signal SG3 to the unillustrated image processing section, and receive the video signal SG2. The timing signal SG3 may include a main scan synchronizing signal and a sub scan synchronizing signal. The video signal SG2 to be received by the printing control section 2 may be edited per page by a host computer. The printing control section 2 may forward, as a print data signal HD-DATA, the video signal SG2 to an LED head 14. The LED head 14 may include a plurality of LEDs that are arrayed in line. The LEDs each may be provided for printing of a single dot (i.e., a pixel).

The printing control section 2 may, upon receiving the video signal SG2 corresponding to one line, send a latch signal HD-LOAD to the LED head 14 to allow the print data signal HD-DATA to be held in the LED head 14. The printing control section 2 may allow for printing with respect to the print data signal HD-DATA held in the LED head 14 even while receiving the subsequent video signal SG2 from the host controller. In FIG. 1, a signal HD-CLK may be a clock signal directed to sending of the print data signal HD-DATA to the LED head 14.

The sending and the receiving of the video signal SG2 may be performed for each print line. Light emitted from the LED head 14 may be applied to the unillustrated photosensitive drum that may be electrostatically charged to a minus potential. This may form, as the dots having an increased potential, latent images of an image to be printed on the photosensitive drum. In the developing unit 8, a toner directed to image formation and having been electrostatically charged to a minus potential may be attracted to each of the dots by means of electric attraction, resulting in development of a toner image. The toner image may then be sent to a transfer unit 16. The transfer unit 16 may, upon turning on of a transfer high-voltage power supply 15 by a transfer signal SG4, transfer the toner image onto the medium that passes through a gap between the photosensitive drum and the transfer unit 16.

The medium onto which the toner image has been transferred may be conveyed to the fixing unit 4 that includes the heater 4a. The toner image may be fixed to the medium by means of heat derived from the fixing unit 4. The medium to which an image has been thus fixed may be further conveyed to be discharged to the outside of the printer from the printing mechanism of the printer through a medium outlet sensor 17.

The printing control section 2 may apply, in response to results of the detection obtained from the medium size sensor 10 and the medium inlet sensor 13, a voltage derived from the transfer high-voltage power supply 15 to the transfer unit 16 only when the medium passes through the transfer unit 16. The printing control section 2 may end the application of the voltage to the developing unit 8 by the charging high-voltage power supply 7 and may at the same time stop the rotation of the development-transfer process motor 6, upon completion of the printing and the passage of the medium through the medium outlet sensor 17.

The printing control section 2 may thereafter repeat the example operation described above.

Figure 2:
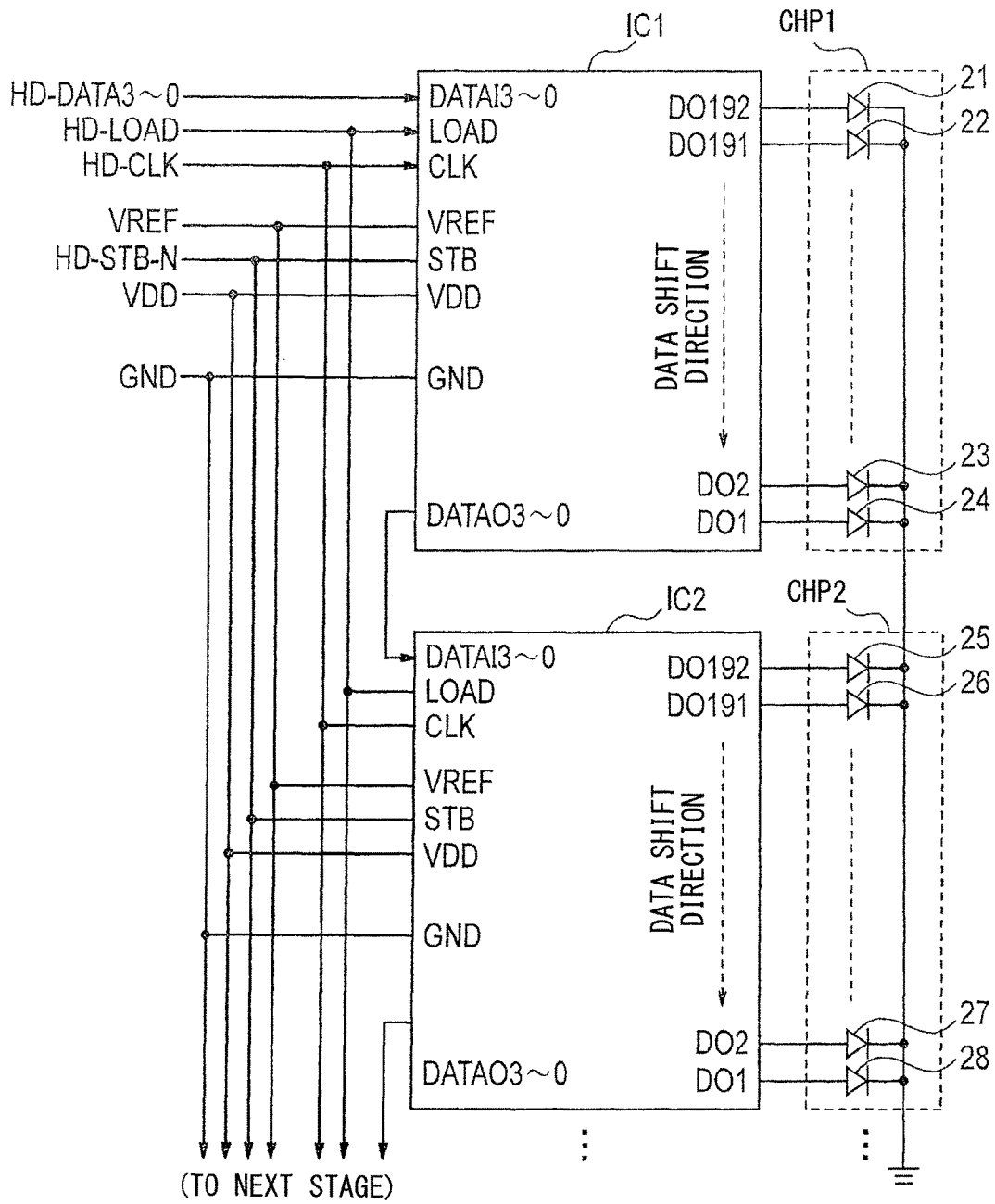
FIG. 2 is a block diagram illustrating a configuration of an LED head according to the first example embodiment.

A description is now given in detail of the LED head 14. FIG. 2 is a block diagram illustrating a configuration of the LED head 14 according to the first example embodiment.

In the first example embodiment, the LED head 14 is described by way of example as being capable of performing the printing at resolution of 600 dots per inch on an A4-size medium.

In this non-limiting example, the total number of LED elements (dots) that forms a light-emitting section may be 4992. To achieve this example configuration, the LED head 14 may include 26 LED arrays each having 192 LED elements. The LED elements each may have a cathode terminal coupled to the ground, and an anode terminal coupled to a drive output terminal of a corresponding driver IC through a method such as, but not limited to, wire bonding. The driver ICs may be disposed adjacent to the LED arrays.

As illustrated in FIG. 1, the print data signal HD-DATA may be supplied together with the clock signal HD-CLK to the LED head 14. In one example of the printer that allows for printing of the A4-size medium and having the resolution of 600 dots per inch, bit data corresponding to 4992 dots may be sequentially forwarded through a shift register that includes flip-flop circuits to be described later in detail.

Then, the latch signal HD-LOAD may be supplied to the LED head 14, causing the bit data to be latched by latch circuits to be described later in detail. Thereafter, based on the bit data and a print drive signal HD-STB-N, any of the light-emitting elements (LEDs) corresponding to dot data at a high level may be turned on.

In FIG. 2, reference numerals CHP1 and CHP2 each denote an LED array chip. Note that illustrations of LED array chips corresponding to reference numerals CHP3 to CHP26 are omitted in FIG. 2.

Reference numerals IC1 and IC2 each denote a driver IC that drives the corresponding LED array. The driver ICs may be configured by the same circuit as each other, and each may be coupled in cascade to any other adjacent driver IC. Note that illustrations of the driver ICs corresponding to reference numerals IC3 to IC26 are omitted in FIG. 2.

Reference numerals 21 to 38 each denote an LED element. A total of 192 LED elements may be disposed per LED array.

In the first example embodiment, four signal lines directed to transmission of print data may be provided, allowing for sending of pieces of data corresponding to four mutually-adjacent LED elements (i.e., four pixels) together per clock signal. The print data signal HD-DATA 3 to 0 outputted from the printing control section 2 may be supplied together with the clock signal HD-CLK to the LED head 14, and the bit data corresponding to 4992 dots may be sequentially forwarded as described above through the shift registers each configured by the flip-flop circuits to be described later in detail.

Then, the latch signal HD-LOAD may be supplied to the LED head 14, causing the bit data to be latched by the latch circuits provided corresponding to the flip-flop circuits.

Thereafter, upon supplying of the print drive signal HD-STB-N, any of the light-emitting elements (LEDs) corresponding to the dot data at the high level may be turned on. In FIG. 2, reference numerals VDD and GND respectively denote a power supply and the ground. A reference numeral VREF denotes a reference voltage directed to instructions on a drive current value for LED drive. The reference voltage VREF may be generated by an unillustrated reference voltage generating circuit provided in the LED head.

The driver ICs IC1 to IC26 each may serve as a light-emission drive circuit, and each may include a later-described LED drive circuit, and a control voltage generating circuit that so generates a command voltage as to allow a drive current for the LED drive circuit to be uniform. In FIG. 2, the reference voltage to be supplied to the control voltage generating circuit is denoted by the reference numeral VREF.

The plurality of LED arrays are provided in the LED head 14 as illustrated in FIG. 2, meaning that a property fluctuation attributable to variation in manufacturing of the elements in the LED arrays may result in variation in light-emission power between the LED arrays and even between the dots in the single LED array, which may in turn result in differences in amount of exposure energy to be applied to the photosensitive drum. Such a phenomenon may appear as variation in dot area upon the development of the photosensitive drum, and thus may undesirably contribute to uneven printing density.

To address such concern, it is preferable that the drive currents for the respective dots of the LEDs be so adjusted to allow the light-emission power to be uniform. The driver ICs IC1 to IC26 may include circuits as described later in detail to adjust the drive currents.

Figure 3A:
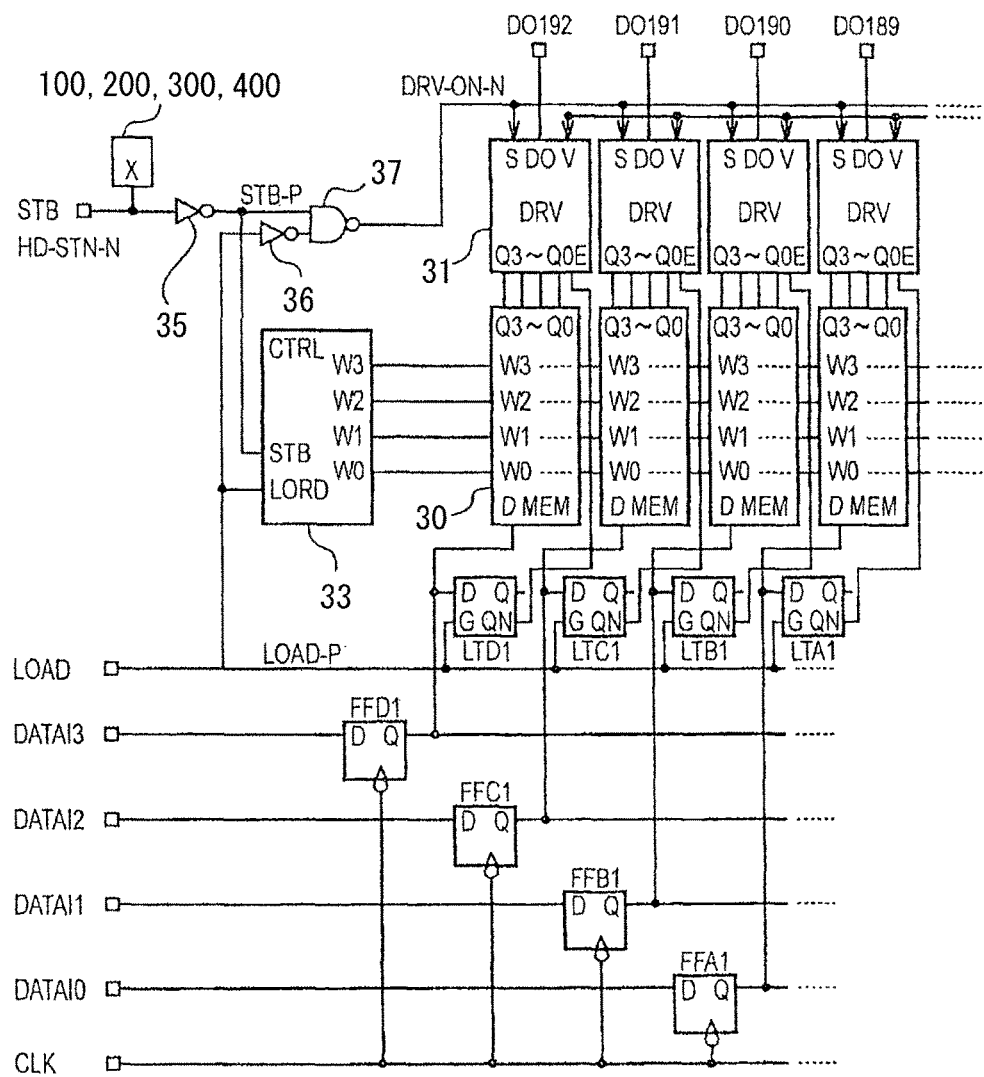
FIGS. 3A and 3B are each a block diagram illustrating a detailed configuration of a driver IC according to any of first to fourth example embodiments.
Figure 3B:
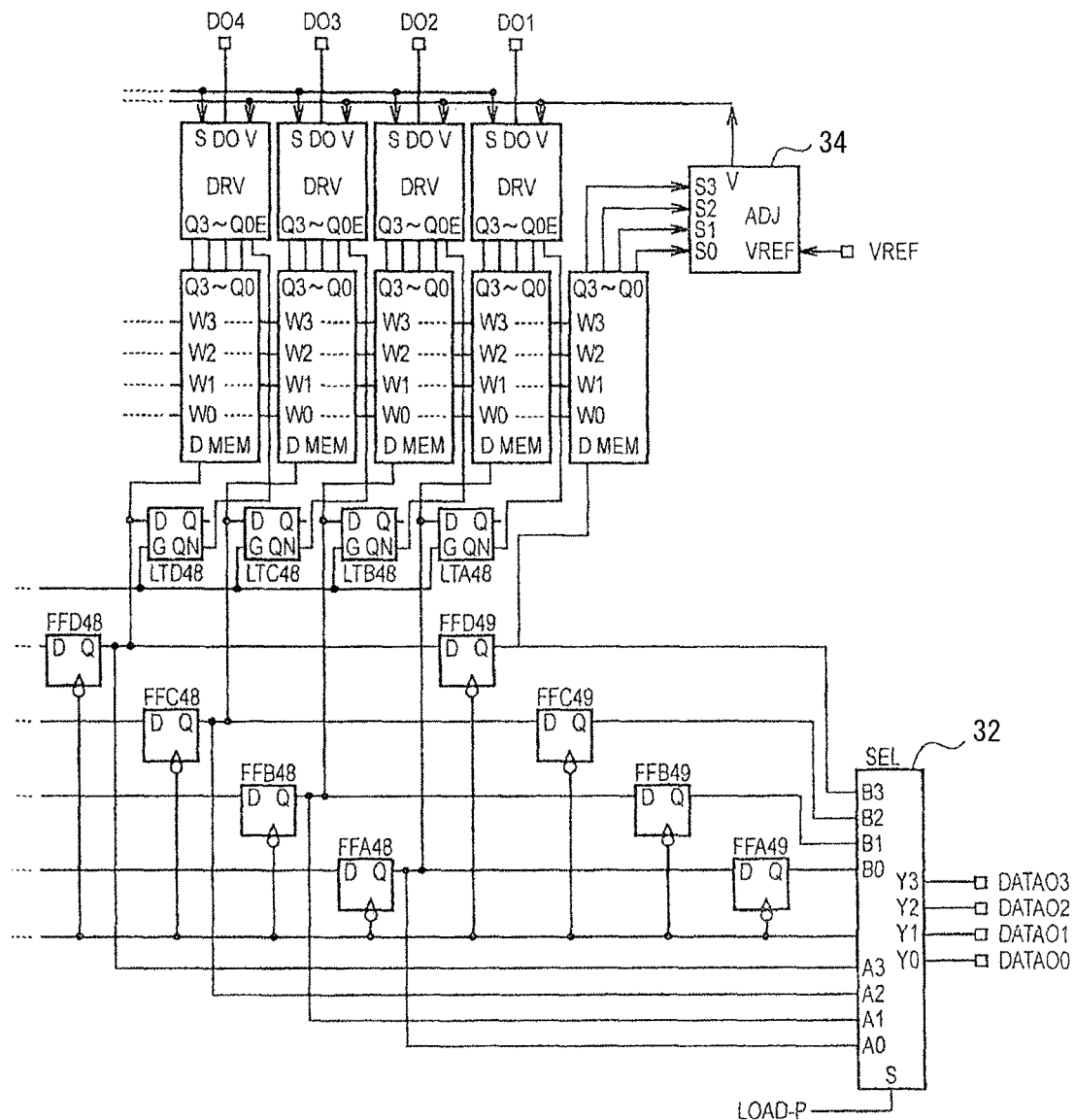

FIGS. 3A and 3B are each a block diagram illustrating a detailed configuration of any driver IC illustrated in FIG. 2.

Reference numerals FFA1 to FFA49, FFB1 to FFB49, FFC1 to FFC49, and FFD1 to FFD49 each denote the flip-flop circuit. These flip-flop circuits may configure the shift register.

Reference numerals LTA1 to LTA48, LTB1 to LTB48, LTC1 to LTC48, and LTD1 to LTD48 each denote a latch device. These latch devices as a whole configure the latch circuit.

In FIGS. 3A and 3B, an MEM block denoted by a reference numeral 30 may be a memory circuit. The memory circuit 30 may store correction data directed to correction of variation in light amounts of the LEDs (referred to as dot correction data), light amount correction data directed to correction of light amounts for each LED array (referred to as chip correction data), and unique data unique to each driver IC.

A DRV block denoted by a reference numeral 31 may be the LED drive circuit.

An SEL block denoted by a reference numeral 32 may be a selector circuit.

A CTRL block denoted by a reference numeral 33 may be a control circuit. The control circuit 33 may generate a write command signal directed to writing of the correction data into the memory circuit 30.

An ADJ block denoted by a reference numeral 34 may be the control voltage generating circuit. The control voltage generating circuit 34 may receive the reference voltage VREF supplied through a VREF terminal to generate a control voltage directed to the LED drive. The reference voltage VREF may be generated by an unillustrated regulator circuit or any other suitable mechanism, and may thus keep a predetermined value even under such circumstances in which a supply voltage drops momentarily as in turning-on drive of all of the LEDs, preventing a decrease in the drive current for the LEDs.

A reference numeral 100 denotes a pull-up circuit.

Reference numerals 35 and 36 each denote an inverter circuit. The inverter circuits 35 and 36 may be coupled to a strobe terminal STB that serves as an input terminal.

A reference numeral 37 denotes an NAND circuit.

The flip-flop circuits FFA1 to FFA49 may be coupled in cascade to each other as illustrated in FIGS. 3A and 3B. A data input terminal DATAI0 of any corresponding driver IC may be coupled to a data input terminal D of the flip-flop circuit FFA1. A data output of each of the flip-flop circuits FFA48 and FFA49 may be supplied to a selector circuit 32. An output terminal Y0 of the selector circuit 32 may be coupled to a data output terminal DATAO0 of any corresponding driver IC.

Similarly, the flip-flop circuits FFB1 to FFB49, the flip-flop circuits FFC1 to FFC49, and the flip-flop circuits FFD1 to FFD49 each may be coupled in cascade to each other. Data input terminals DATAI1, DATAI2, and DATAI3 of any corresponding driver IC may be coupled to respective data input terminals D of the flip-flop circuits FFB1, FFC1, and FFD1.

A data output of each of the flip-flop circuits FFB48 and FFB49, a data output of each of the flip-flop circuits FFC48 and FFC49, and a data output of each of the flip-flop circuits FFD48 and FFD49 may also be supplied to the selector circuit 32. Output terminals Y1, Y2, and Y3 of the selector circuit 32 may be coupled to respective data output terminals DATAO1, DATAO2, and DATAO3 of any corresponding driver IC.

With this configuration, the flip-flop circuits FFA1 to FFA49, the flip-flop circuits FFB1 to FFB49, the flip-flop circuits FFC1 to FFC49, and the flip-flop circuits FFD1 to FFD49 each form a shift register circuit having 49 steps. Also, the selector circuit 32 allows the number of shift steps of each of the shift registers to be switched between 48 steps and 49 steps.

Further, the data output terminals DATAO0 to DATAO3 of any driver IC may be coupled respectively to the data input terminals DATAI0 to DATAI3 of the subsequent-stage driver IC. Hence, the shift registers configuring all of the driver ICs denoted by the reference numerals IC1 to IC26 may form a shift register circuit having 48 by 26 steps or 49 by 26 steps which performs shifting, in synchronization with the clock signal, of the print data signal HD-DATA supplied from the printing control section 2 to the DRV block (i.e., the LED drive circuit 31) provided in the first-stage driver IC.

The negative-logic strobe signal HD-STB-N supplied to the strobe terminal STB may be converted into the positive-logic strobe signal STB-P by the inverter circuit 35, following which the converted positive-logic strobe signal STB-P may be supplied to an NAND circuit 37.

The latch signal LOAD-P supplied through a terminal LOAD may also be supplied to the NAND circuit 37 to be converted into a signal DRV-ON-N that controls on and off of a drive performed on the DRV block (i.e., the LED drive circuit 31).

Figure 4:
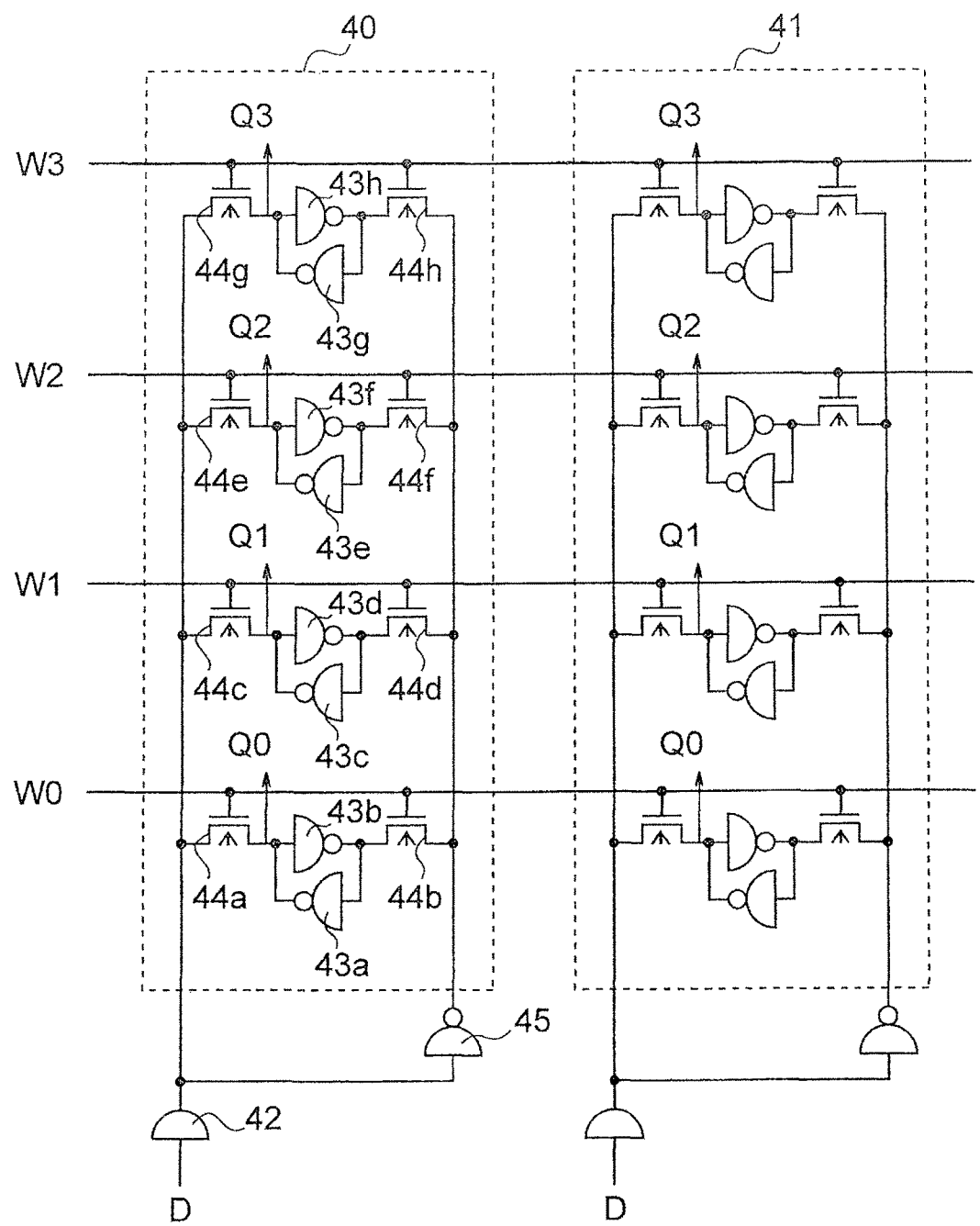
FIG. 4 illustrates a circuit configuration of an MEM block serving as a memory circuit according to the first example embodiment.

FIG. 4 illustrates a circuit configuration of the MEM block that serves as the memory circuit 30 illustrated in FIGS. 3A and 3B.

In the example configuration of the first example embodiment, the dot correction data directed to the correction of the light amounts of the LEDs may have 4 bits, and the drive current for the LEDs may be adjusted in 16 levels for each dot to perform the correction of the light amounts.

FIG. 4 illustrates two (corresponding to two dots) mutually-adjacent memory cell circuits including a first memory cell circuit 40 and a second memory cell circuit 41.

The first memory cell circuit 40 may store the correction data corresponding to odd-th dot (for example but not limited to, a first dot). The second memory cell circuit 41 may store the correction data corresponding to even-th dot (for example but not limited to, a second dot). The first memory cell circuit 40 and the second memory cell circuit 41 may have the same configuration as each other; hence, a description is given in the following on the first memory cell circuit 40.

The first memory cell circuit 40 may include a buffer circuit 42 inverter circuits 43a to 43h that configure correction memory cells, and NMOS transistors 44a to 44h.

A reference numeral 45 denotes an inverter circuit. The inverter circuit 45 may have an input terminal coupled to an output terminal of the buffer circuit 42.

The first memory cell circuit 40 may also include a correction data input terminal D, memory cell selection terminals W0 to W3, and correction data output terminals Q0 to Q3.

The correction data input terminal D of the first memory cell circuit 40 illustrated in FIG. 4 may be coupled to corresponding one of the data output terminals Q of the flip-flop circuits FFA1 to FFA48, FFB1 to FFB48, FFC1 to FFC48, and FFD1 to FFD48.

The memory cell selection terminals W0 to W3 may respectively receive write control signals W0 to W3 supplied from the control circuit 33.

An input terminal of the buffer circuit 42 may serve as the correction data input terminal D. An output terminal of the buffer circuit 42 may be coupled to first terminals of respective NMOS transistor 44a, NMOS transistor 44c, NMOS transistor 44e, and NMOS transistor 44g.

The inverter circuits 43a and 43b, the inverter circuits 43c and 43d, the inverter circuits 43e and 43f, and the inverter circuits 43g and 43h each may be coupled in series and each may form the memory cell.

The NMOS transistors 44a and 44b, the NMOS transistors 44c and 44d, the NMOS transistors 44e and 44f, and the NMOS transistors 44g and 44h each may be coupled in series, and one end of each of such series connections may be coupled to the output terminal of the buffer circuit 42.

An output terminal of the inverter circuit 45 may be coupled to a first terminal of each of the NMOS transistors 44b, 44d, 44f, and 44h.

A gate terminal of each of the NMOS transistors 44a and 44b may be coupled to the memory cell selection terminal W0. A gate terminal of each of the NMOS transistors 44c and 44d may be coupled to the memory cell selection terminal W1. A gate terminal of each of the NMOS transistors 44e and 44f may be coupled to the memory cell selection terminal W2. A gate terminal of each of the NMOS transistors 44g and 44h may be coupled to the memory cell selection terminal W3.

An output terminal of the inverter circuit 43a may be coupled to the correction data output terminal Q0. An output terminal of the inverter circuit 43c may be coupled to the correction data output terminal Q1. An output terminal of the inverter circuit 43e may be coupled to the correction data output terminal Q2. An output terminal of the inverter circuit 43g may be coupled to the correction data output terminal Q3.

Figure 5:
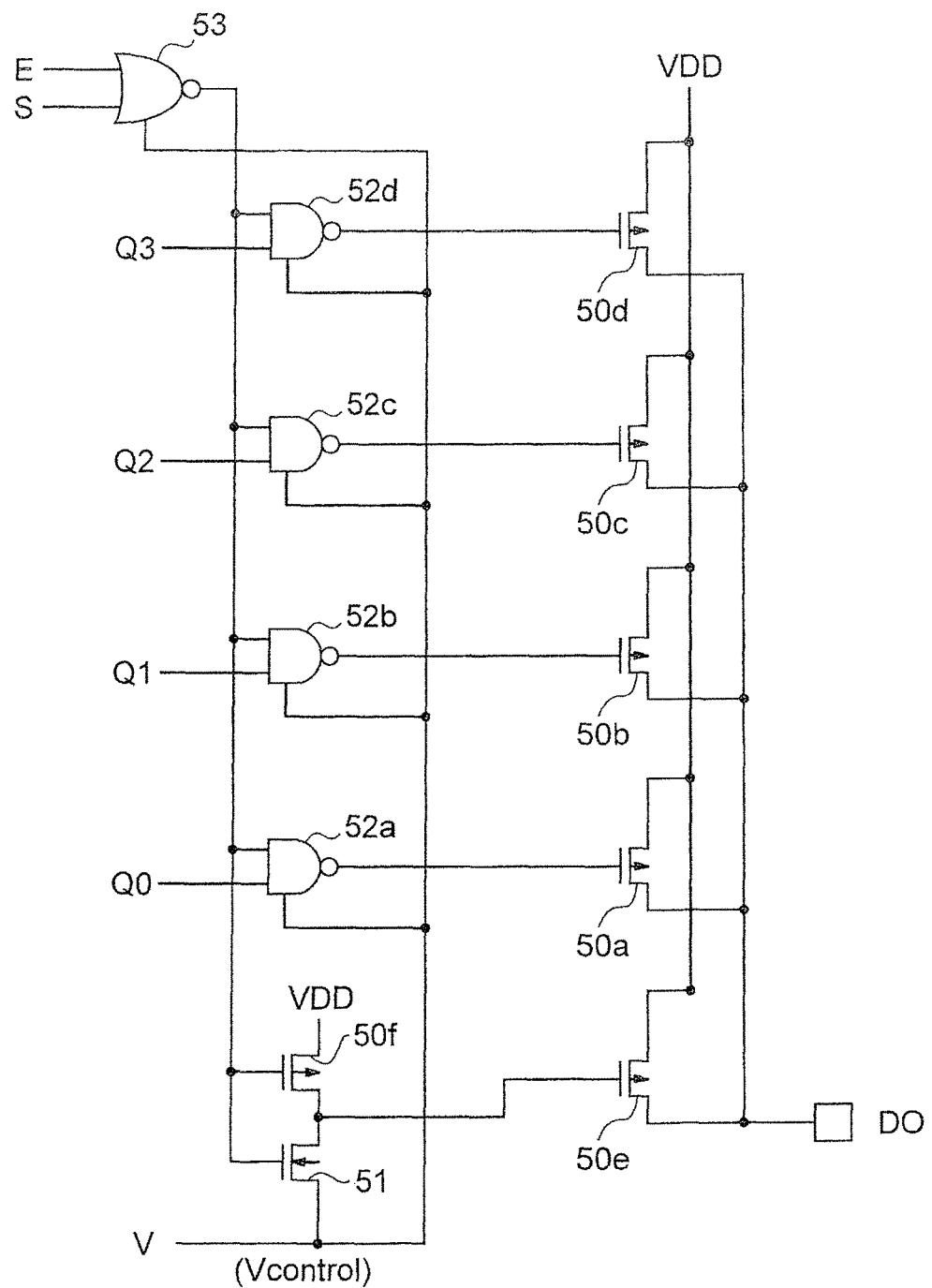
FIG. 5 illustrates a circuit configuration of a DRV block serving as an LED drive circuit according to the first example embodiment.

FIG. 5 illustrates a circuit configuration of the DRV block that serves as the LED drive circuit 31 illustrated in FIGS. 3A and 3B.

The LED drive circuit 31 may include PMOS transistors 50a to 50f, an NMOS transistor 51, NAND circuits 52a to 52d, and a NOR circuit 53.

The LED drive circuit 31 may also include a print data input terminal E (negative logic), an input terminal S (negative logic) that receives instructions on turning on and off for the LED drive, an input terminal V, correction data input terminals Q0 to Q3, and a drive current output terminal DO.

The print data input terminal E of the LED drive circuit 31 may be coupled to a corresponding QN output terminal of the latch circuit, i.e., coupled to corresponding one of the latch devices LTA1 to LTA48, LTB1 to LTB48, LTC1 to LTC48, and LTD1 to LTD48 illustrated in FIGS. 3A and 3B.

The correction data input terminals Q3 to Q0 may be coupled to respective correction data output terminals Q3 to Q0 of the memory circuit 30 illustrated in FIG. 4. The input terminal S may receive the signal outputted from the NAND circuit 37 illustrated in FIGS. 3A and 3B (i.e., the signal DRV-ON-N) which instructs turning on and off for the LED drive. The input terminal V may receive a control voltage Vcontrol from the control voltage generating circuit 34 illustrated in FIGS. 3A and 3B.

The drive current output terminal DO may be coupled to an anode of a corresponding LED element through an unillustrated bonding wire.

The NOR circuit 53 may have two input terminals one of which is coupled to the input terminal S and the other is coupled to the print data input terminal E. A first input terminal of each of the NAND circuits 52a to 52d may be coupled to an output terminal of the NOR circuit 207. Second input terminals of the respective NAND circuits 52a to 52d may be coupled to the respective correction data output terminals Q3 to Q0 of the memory circuit 30.

The PMOS transistors 50a to 50d may have respective gate terminals coupled to the respective output terminals of the NAND circuits 52a to 52d.

The PMOS transistors 50a to 50e may have respective source terminals coupled to the power supply VDD. The PMOS transistors 50a to 50e may have respective drain terminals coupled to the drive current output terminal DO.

A power supply for each of the NAND circuits 52a to 52d and the NOR circuit 53 may be coupled to the power supply VDD, and a ground terminal of each of those circuits may be coupled to the input terminal V to keep a potential defined by the control voltage Vcontrol.

As described later in detail, a potential difference between a potential of the power supply VDD and the potential defined by the control voltage Vcontrol may be substantially equal to a gate-to-source voltage upon turning on of each of the PMOS transistors 50a to 50e. Hence, varying a voltage of the potential difference allows for adjustment of a drain current of each of the PMOS transistors 50a to 50e.

The control voltage generating circuit 34 illustrated in FIGS. 3A and 3B may receive the reference voltage VREF from an unillustrated reference voltage circuit, and so control the control voltage Vcontrol as to allow the drain current of each of the PMOS transistors 50a to 50d and any other element to have a predetermined value.

An output of the NOR circuit 53 may be at the high level when the print data is on (an input level of the print data input terminal E at this time may be low) and when the signal related to the instructions on turning on and off for the LED drive received through the input terminal S is at the low level and thus turning on of the LED is instructed. Here, output signals of the respective NAND circuits 52a to 52d and an output of the inverter circuit formed by the PMOS transistor 50f and the NMOS transistor 51 both may be at the potential defined by the power supply VDD or the potential defined by the control voltage Vcontrol, based on pieces of data supplied to the respective correction data input terminals Q3 to Q0.

The PMOS transistor 50e may be a main drive transistor that supplies a corresponding LED with a main drive current, whereas the PMOS transistors 50a to 50d each may be an auxiliary drive transistor that adjusts, on a dot basis, the drive current of the corresponding LED to perform the light amount correction thereof.

The PMOS transistor 50e serving as the main drive transistor may be driven based on the print data.

The PMOS transistors 50a to 50d serving as the auxiliary drive transistors may be selectively driven based on the outputs of the respective correction data output terminals Q3 to Q0 of the memory circuit 30 (i.e., the MEM block), when the output of the NOR circuit 53 is at the high level.

In other words, driving of the PMOS transistor 50e as the main drive transistor and the selective driving of the PMOS transistors 50a to 50d as the auxiliary drive transistors based on the pieces of correction data result in supply of the drive current to a corresponding LED from the drive current output terminal DO. The drive current may be the addition of the drain current of any of the selected PMOS transistors 50a to 50d as the auxiliary drive transistors to the drain current of the PMOS transistor 50e as the main drive transistor.

Upon driving of each of the PMOS transistors 50a to 50d, an output of each of the NAND circuits 52a to 52d may be at the low level, i.e., at a level equal to the control voltage Vcontrol substantially, whereby a gate potential of each of the PMOS transistors 50a to 50d may be substantially equal to the control voltage Vcontrol. Under such circumstances, the PMOS transistor 50f may be turned off and the NMOS transistor 51 may be turned on, and a gate potential of the PMOS transistor 50e may be equal to the control voltage Vcontrol substantially as well. It is possible to adjust values of the drain currents of the respective PMOS transistors 50a to 50d collectively based on the control voltage Vcontrol accordingly.

The NAND circuits 52a to 52d in such a situation may be operated based on the potential defined by the power supply VDD as a power supply potential and the potential defined by the control voltage Vcontrol as a ground potential.

Figure 6:
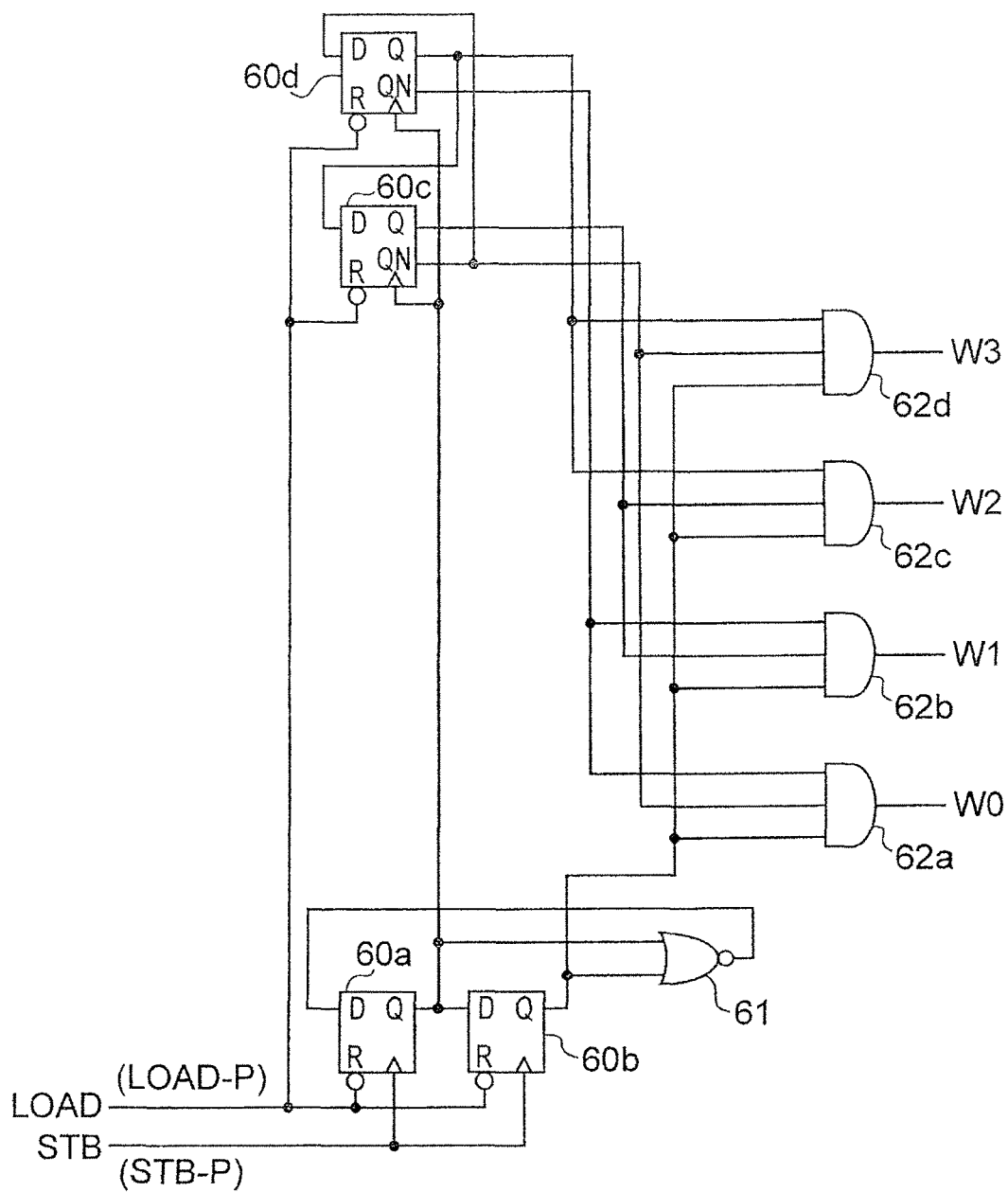
FIG. 6 is a circuit diagram illustrating a configuration of a CTRL block serving as a control circuit according to the first example embodiment.

FIG. 6 is a circuit diagram illustrating a configuration of the CTRL block serving as the control circuit 33 illustrated in FIGS. 3A and 3B.

The control circuit 33 may include flip-flop circuits 60a to 60d, a NOR circuit 61, and AND circuits 62a to 62d.

The flip-flop circuits 60a to 60d each may have a negative-logic reset terminal (R) coupled to the terminal LOAD to receive the latch signal LOAD-P. The flip-flop circuits 60a and 60b each may have a clock terminal coupled to the strobe terminal STB to receive the STB-P signal, and a Q output terminal coupled to an input terminal of the NOR circuit 61. The NOR circuit 61 may have an output terminal coupled to a D input terminal of the flip-flop circuit 60a. A clock terminal of each of the flip-flop circuits 60c and 60d may be coupled to the Q output terminal of the flip-flop circuit 60a. A D input terminal of the flip-flop circuit 60c may be coupled to a Q output terminal of the flip-flop circuit 60d. A D input terminal of the flip-flop circuit 60d may be coupled to a QN output terminal of the flip-flop circuit 60c.

The AND circuit 62d may have a first input terminal coupled to the Q output terminal of the flip-flop circuit 60d, and a second input terminal coupled to the QN output terminal of the flip-flop circuit 60c. The AND circuit 62c may have a first input terminal coupled to the Q output terminal of the flip-flop circuit 60d, and a second input terminal coupled to a Q output terminal of the flip-flop circuit 60c. The AND circuit 62b may have a first input terminal coupled to a QN output terminal of the flip-flop circuit 60d, and a second input terminal coupled to the Q output terminal of the flip-flop circuit 60c. The AND circuit 62a may have a first input terminal coupled to the QN output terminal of the flip-flop circuit 60d, and a second input terminal coupled to the QN output terminal of the flip-flop circuit 60c. The AND circuits 62a to 62d each may have a third input terminal coupled to the Q output terminal of the flip-flop circuit 60b. The AND circuits 62a to 62d may also have respective output terminals coupled to the respective memory cell selection terminals W0 to W3 to output the write control signals W0 to W3 to be supplied to the memory circuit 30 illustrated in FIGS. 3A and 3B.

Figure 7:
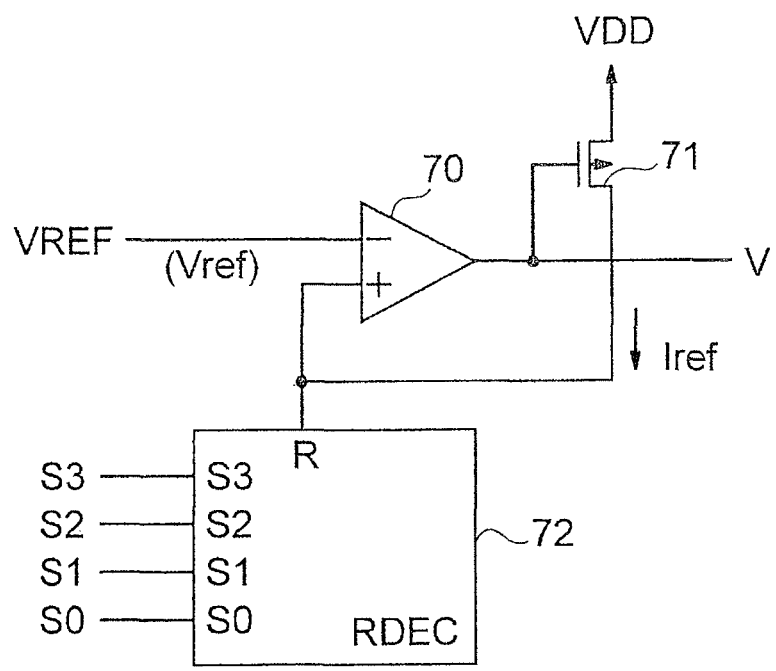
FIG. 7 is a circuit diagram illustrating a configuration of an ADJ block serving as a control voltage generating circuit according to the first example embodiment.

FIG. 7 is a circuit diagram illustrating a configuration of the ADJ block serving as the control voltage generating circuit 34 illustrated in FIGS. 3A and 3B. The control voltage generating circuit 34 may be provided per driver IC chip.

The control voltage generating circuit 34 may include an operational amplifier 70, a PMOS transistor 71, and a resistor changing circuit (RDEC) 72.

The PMOS transistor 71 may have a source terminal coupled to the power supply VDD, and a gate terminal coupled to an output terminal of the operational amplifier 70 and the input terminal V. The PMOS transistor 71 may have a gate length equal to a gate length of each of the PMOS transistors 50a to 50e illustrated in FIG. 5.

The operational amplifier 70 may have an inverting input terminal coupled to the VREF terminal to receive application of the reference voltage VREF. The operational amplifier 70 may have a non-inverting input terminal coupled to a drain terminal of the PMOS transistor 71 and a terminal R of the resistor changing circuit 72.

The operational amplifier 70 may also have the output terminal coupled to the gate terminal of the PMOS transistor 71 and the input terminal V. The operational amplifier 70 may be coupled to a circuit of the LED drive circuit 31 as illustrated in FIG. 5 to output the control voltage Vcontrol described above.

The resistor changing circuit 72 may have input terminals S3 to S0 respectively coupled to the correction data output terminals Q3 to Q0 of the memory circuit 30 illustrated in FIGS. 3A and 3B. The resistor changing circuit 72 may switch resistors provided therein in 16 levels in response to 16 kinds of combinations on logic signal levels supplied to the four input terminals S3 to S0, to allow for adjustment of a resistance value between the terminal R and the ground in 16 levels.

The operational amplifier 70, the PMOS transistor 71, and the resistor changing circuit 72 may form a feedback control circuit as illustrated in FIG. 7. A potential of the non-inverting input terminal of the operational amplifier 70 may be controlled to be substantially equal to the reference voltage VREF. Hence, a drain current Iref of the PMOS transistor 71 illustrated in FIG. 7 may be determined from the resistance value of the resistor changing circuit 72 (for example, denoted as R0 to R15) and the reference voltage VREF supplied to the operational amplifier 70.

More specifically, the drain current Iref of the PMOS transistor 71 may have a value expressed by the following expression (1):

$$Iref=VREF/R15 \qquad (1)$$

where R15 is the resistance value between the terminal R of the resistor changing circuit 72 and the ground when logical values based on the input terminals S3 to S0 are "1111" and thus a maximum degree of correction is instructed.

Also, the drain current Iref of the PMOS transistor 71 may have a value expressed by the following expression (2):

$$Iref=VREF/R7 \qquad (2)$$

where R7 is the resistance value between the terminal R of the resistor changing circuit 72 and the ground when the logical values based on the input terminals S3 to S0 are "0111" and thus a medium degree of correction is instructed.

Also, the drain current Iref of the PMOS transistor 71 may have a value expressed by the following expression (3):

$$Iref=VREF/R0 \qquad (3)$$

where R0 is the resistance value between the terminal R of the resistor changing circuit 72 and the ground when the logical values based on the input terminals S3 to S0 are "0000" and thus a minimum degree of correction is instructed.

The PMOS transistors 50a to 50e illustrated in FIG. 5 and the PMOS transistor 71 may have the gate length equal to each other and may be so controlled as to operate in a saturation region. Hence, the PMOS transistors 50a to 50e and 71 are in a current-mirror relationship, meaning that a drain current proportional to the drain current Iref may be generated upon turning on of the PMOS transistors 50a to 50e. As a result, it is possible to adjust the drain current Iref in 16 levels based on the logical values to be supplied to the input terminals S3 to S0, and thus to allow the drain current of the PMOS transistors 50a to 50e illustrated in FIG. 5 to be adjustable in 16 levels as well.

Before describing the pull-up circuit 100 illustrated in FIGS. 3A and 3B, a description is given now of a pull-up circuit according to a comparative example.

A driver IC that controls light emission of LEDs used for an exposure section of an image forming apparatus typically includes a strobe terminal. The strobe terminal is provided therein with a pull-up resistor for one reason discussed below.

The driver IC and a printed circuit board that mounts the driver IC may be coupled to each other through a bonding wire. An abnormality in connection of the bonding wire attributable to an assembly production may put the bonding wire in an open state, which may make any LED uncontrollable and thus make the LED always turned on, or may even result in a serious issue including an abnormal heat generation and burnout in a severe case. To prevent such issues, the pull-up resistor is provided in the strobe terminal of the driver IC to provide a fail-safe design that allows for a failure where an LED is turned off even upon an occurrence of an abnormality in connection of the bonding wire.

A supply voltage of the driver IC is determined based on a forward voltage, which is typically 5 V.

An open voltage of the strobe terminal of the driver IC is accordingly about 5 V by means of the pull-up resistor. In such a situation, a supply voltage of an ASIC LSI used in a printing control section that controls an LED head is typically 3.3 V, meaning that a high-level signal thereof has to be about 3.3 V as well.

Hence, a reverse current may flow from the 5 V power supply of the pull-up resistor of the driver IC to the 3.3 V power supply of the ASIC LSI of the printing control section, which may in turn cause a latch-up breakage of the ASIC LSI.

In particular, a large number of driver ICs are provided in the LED head, and the strobe terminals of such driver ICs are coupled in parallel to terminals of the ASIC LSI, resulting in a large total amount of the reverse current and thus increasing a concern of the breakage.

Figure 8A:
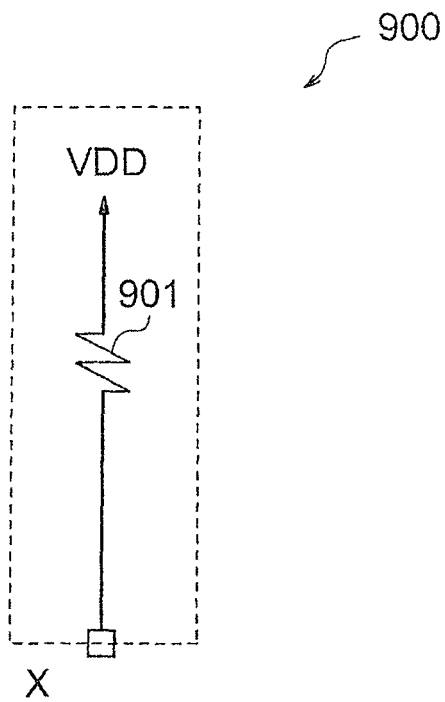
FIGS. 8A and 8B each schematically illustrate a pull-up circuit according to a first comparative example.
Figure 8B:
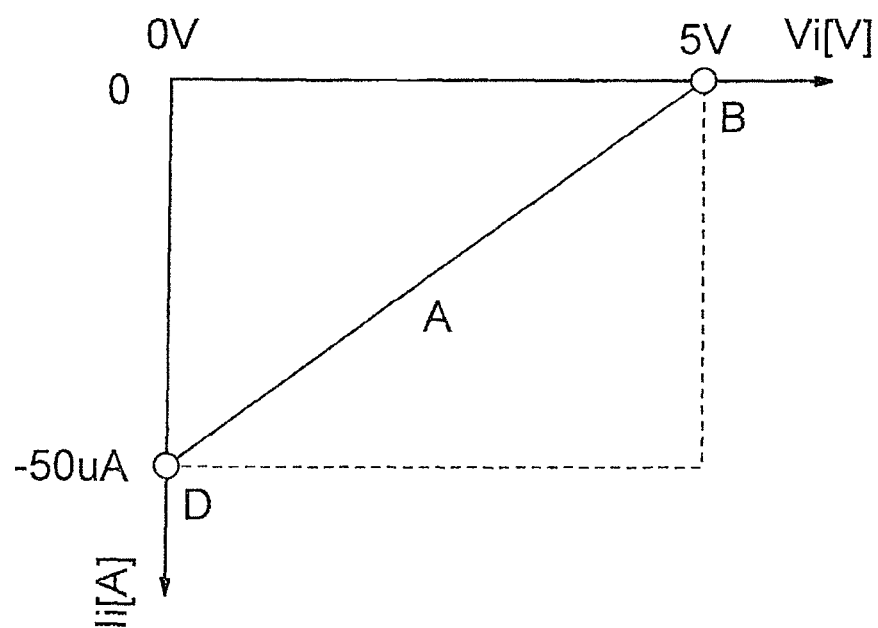

FIGS. 8A and 8B each schematically illustrate a pull-up circuit according to a first comparative example.

FIG. 8A schematically illustrates a configuration of the pull-up circuit according to the first comparative example.

The pull-up circuit 900 according to the first comparative example includes a resistor 901. A power supply VDD is coupled to a terminal X through a resistor 901.

FIG. 8B is a graph illustrating characteristics of the pull-up circuit 900, in which a horizontal axis represents a potential Vi [in V] of the terminal X, whereas a vertical axis represents a current Ii [in A] that flows out from the terminal X. Note that the current Ii has a minus value indicating that a direction of the current is based on outflow.

A point B on a characteristic line A of the graph represents a case where a potential of the terminal X is 5 V. In this case, a current of the terminal X is zero.

The current Ii in absolute value increases with a decrease in potential of the terminal X. The current Ii typically has a current value of minus 50 μA in an example illustrated in FIG. 8B when the potential of the terminal X decreases down to a potential of 0 V as represented by a point D.

In the illustrated example, the potential at the point B is 5 V, and an open voltage of the pull-up circuit 900 illustrated in FIG. 8A is 5 V.

Also, the characteristic line A of the graph illustrated in FIG. 8B is in a linear fashion, and the resistance value is defined as R=5 V/50 μA=100 KΩ based on the slope of the characteristic line A.

Figure 9A:
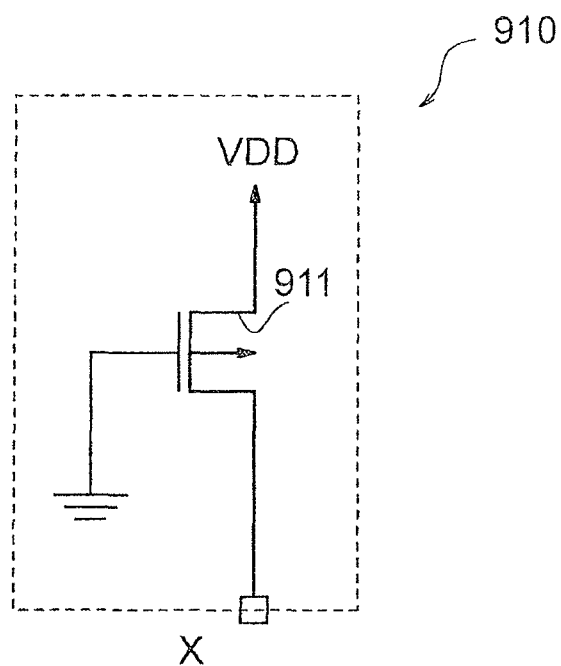
FIGS. 9A and 9B each schematically illustrate a pull-up circuit according to a second comparative example.
Figure 9B:
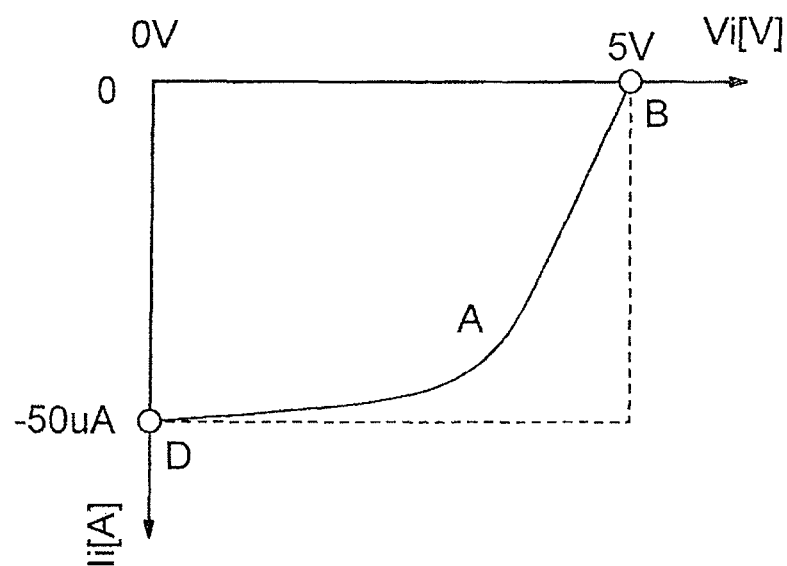

FIGS. 9A and 9B each schematically illustrate a pull-up circuit according to a second comparative example.

FIG. 9A schematically illustrates a configuration of the pull-up circuit according to the second comparative example.

The pull-up circuit 910 according to the second comparative example includes a PMOS transistor 911. The PMOS transistor 911 may have a source terminal coupled to the power supply VDD, a gate terminal coupled to the ground, and a drain terminal coupled to the terminal X.

FIG. 9B is a graph illustrating characteristics of the pull-up circuit 910, in which a horizontal axis represents a potential Vi [V] of the terminal X, whereas a vertical axis represents a current Ii [A] that flows out from the terminal X and has a minus value indicating that a direction of the current is based on outflow.

A point B on a characteristic line A of the graph represents a case where a potential of the terminal X is 5 V. In this case, a current of the terminal X is zero.

The current Ii in absolute value increases with a decrease in potential of the terminal X. The current Ii typically has a current value of minus 50 μA in an example illustrated in FIG. 9B when the potential of the terminal X decreases down to a potential of 0 V as represented by a point D.

Unlike the characteristic line A illustrated in FIG. 8B, the characteristic line A of the pull-up circuit 910 according to the second comparative example is in a non-linear fashion as illustrated in FIG. 9B and thus it is difficult to define the resistance value simply. Nonetheless, as with FIG. 8B, a ground short-circuit current at the point D is minus 50 μA, the potential at the point B is 5 V, and the open voltage of the pull-up circuit 910 is 5 V in the second comparative example illustrated in FIG. 9B.

Figure 10:
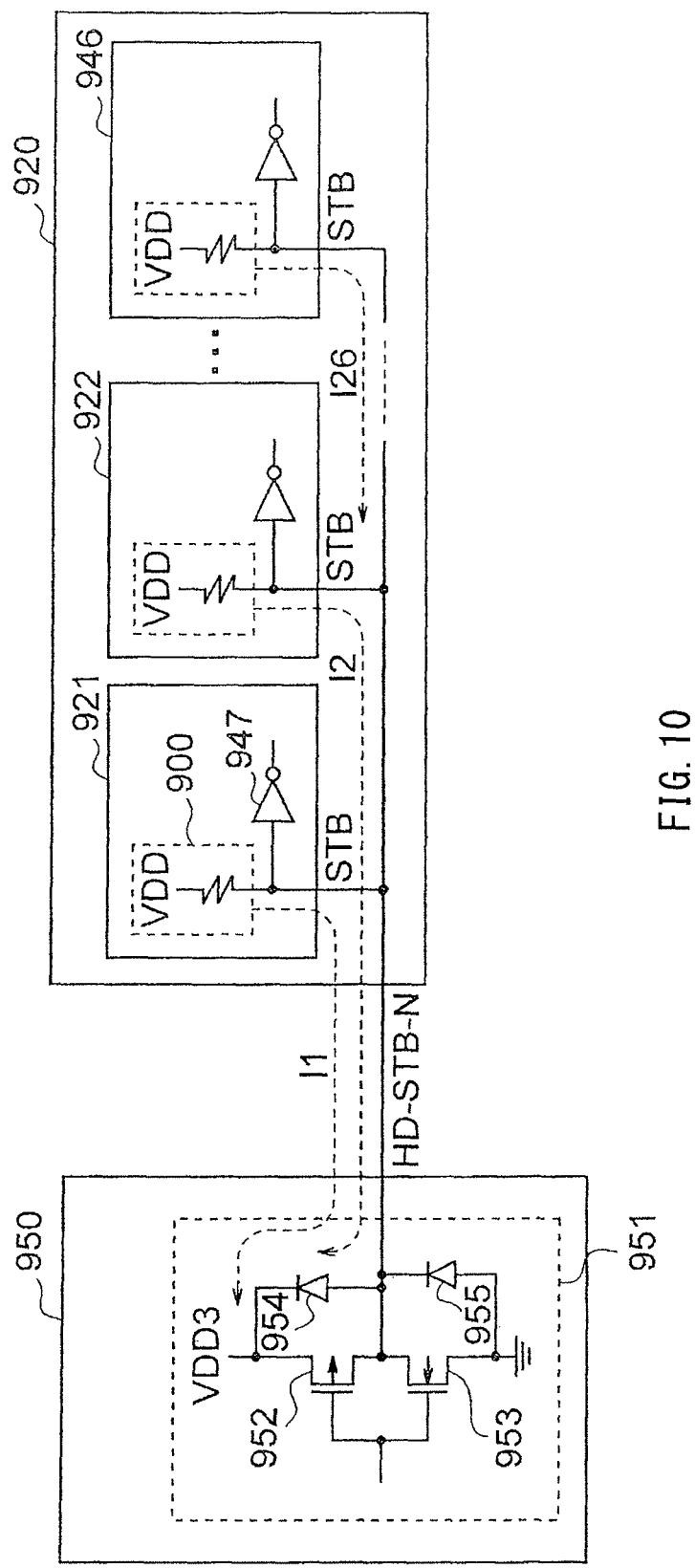
FIG. 10 schematically illustrates a first issue associated with a printing control section and an LED head that uses a driver IC according to a comparative example.

FIG. 10 schematically illustrates a first issue associated with a printing control section 950 and an LED head 920 that uses a driver IC according to a comparative example.

The LED head 920 includes driver ICs 921 to 946.

The driver ICs 921 to 946 each include a pull-up circuit 900. The pull-up circuits 900 are each coupled to an STB terminal of the corresponding driver IC.

A reference numeral 947 denotes an inverter circuit coupled to an unillustrated internal circuit of the corresponding driver IC.

A reference numeral 651 denotes a key part of a signal output section of an ASIC LSI provided in the printing control section 950. A reference numeral 952 denotes a PMOS transistor. A reference numeral 953 denotes an NMOS transistor. A reference numeral 954 denotes a parasitic diode generated in association with the PMOS transistor 952. A reference numeral 955 denotes a parasitic diode generated in association with the NMOS transistor 953.

The PMOS transistor 952 has a source terminal coupled to a power supply VDD3 that has a potential of 3.3 V typically. The PMOS transistor 952 has a drain terminal coupled to a drain terminal of the NMOS transistor 953. The NMOS transistor 953 has a source terminal coupled to the ground.

The PMOS transistor 952 and the NMOS transistor 953 each have a gate terminal coupled to a terminal that supplies an internal signal generated by an unillustrated control circuit.

The PMOS transistor 952 and the NMOS transistor 953 form a CMOS inverter circuit.

The parasitic diode 954 has a cathode terminal coupled to the power supply VDD3, and an anode terminal coupled to STB terminals.

Similarly, the parasitic diode 955 has an anode terminal coupled to the ground, and a cathode terminal coupled to the STB terminals.

As described above with reference to FIG. 8, the open voltage at the STB terminal of any driver IC is at a potential defined by the power supply VDD, i.e., 5V. Under such circumstances, the potential of the power supply VDD3 is set to 3.3 V and a forward voltage of the parasitic diode 954 is typically about 0.6 V. Hence, a current is generated, as a result of the flow out from the STB terminal of any driver IC 921, in a path that travels through the parasitic diode 954 to reach the power supply VDD3. The thus-generated current is denoted as the current I1 in FIG. 10.

Likewise, currents I2 to I26 are generated respectively in the driver ICs 922 to 946.

The driver ICs 921 to 946 have the same circuit configuration as each other and thus current values of the respective currents I1 to I26 are equal to each other. Therefore, the current that flows in a forward direction toward the parasitic diode 954 results in an unignorable amount defined by 26×I0 where the current value of each of the current I1 to I26 is defined as I0.

The latch-up breakage of a CMOS inverter may be generated as a result of the current that flows in the forward direction toward the parasitic diode 954 or 955. In one configuration illustrated in FIG. 10 according to a comparative example as described above, the forward current is generated through the parasitic diode 954, leading to a generation of a latch-up trigger current in the CMOS inverter circuit formed by the PMOS transistor 952 and the NMOS transistor 953 and concerns over breakage accordingly.

To address the concerns over the breakage, one measure may be to provide an additional buffer device between a strobe signal output of an ASIC LSI and an strobe signal input of an LED head. The buffer device performs a level conversion of a 3.3 V signal and a 5 V signal.

Figure 11A:
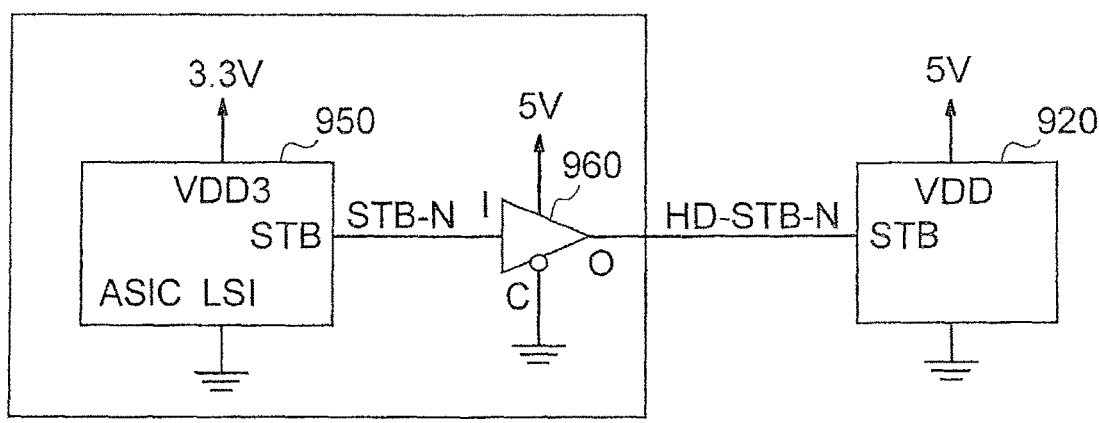
FIGS. 11A to 11C each schematically illustrate a second issue associated with the printing control section and the LED head that uses a driver IC according to a comparative example.
Figure 11B:
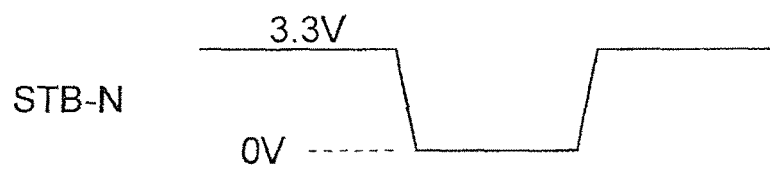
Figure 11C:
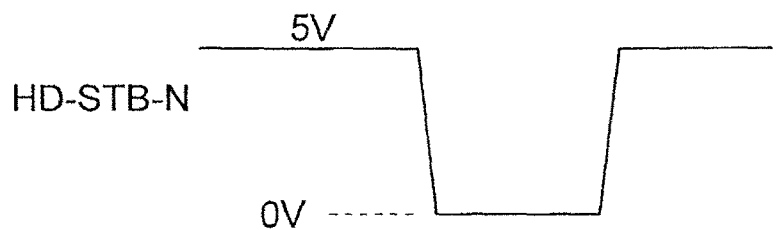

FIGS. 11A to 11C each schematically illustrate a second issue associated with the printing control section 950 and the LED head 920 that uses a driver IC according to a comparative example.

A reference numeral 960 illustrated in FIG. 11A is a buffer circuit. The buffer circuit 960 may be, for example, a circuit available under the model number "SN74HCT125" from Texas Instruments Incorporated or any other circuit.

A power supply of an ASIC LSI of the printing control section 950 is denoted by the reference numeral VDD3. The power supply VDD3 has a voltage of 3.3 V and a ground potential is 0 V.

The ASIC LSI of the printing control section 950 has an STB output terminal from which a signal STB-N is outputted. The signal STB-N is supplied to an input terminal I of the buffer circuit 960. A power supply terminal of the buffer circuit 960 is set to 5 V, whereas an unillustrated ground terminal thereof is set to zero V. A terminal C of the buffer circuit 960 is an output enable control terminal and coupled to the ground.

An output terminal O of the buffer circuit 960 is coupled to a corresponding strobe terminal STB of the LED head 920. A waveform of a signal outputted from the buffer circuit 960 is illustrated as HD-STB-N in FIG. 11C.

The LED head 920 includes a drive circuit that drives an LED element, requiring a supply voltage of the drive circuit to be higher in value than a forward voltage of the LED element. Hence, 5 V which is larger than 3.3 V used for the ASIC LSI is selected for the supply voltage of the drive circuit.

FIGS. 11B and 11C each schematically illustrate a signal waveform derived from the example configuration illustrated in FIG. 11A according to a comparative example.

Referring to FIG. 11B, a high level and a low level of the output signal STB-N outputted from the ASIC LSI are respectively at about 3.3 V and about 0 V.

Referring to FIG. 11C, a high level and a low level of the output signal HD-STB-N outputted from the buffer circuit 960 are respectively at about 5 V and about 0 V.

In one configuration illustrated in FIG. 11A according to a comparative example, the generation of the latch-up trigger current described above with reference to FIG. 10 is prevented, making it possible to overcome the concerns over breakage. This configuration, however, requires the additional buffer circuit 960 as illustrated in FIG. 11A, increasing the number of component parts and manufacturing costs. Also, the buffer circuit 960 is newly installed, increasing the occupancy area on the printed circuit board and imposing a significant limitation on miniaturization of a circuit.

Figure 12:
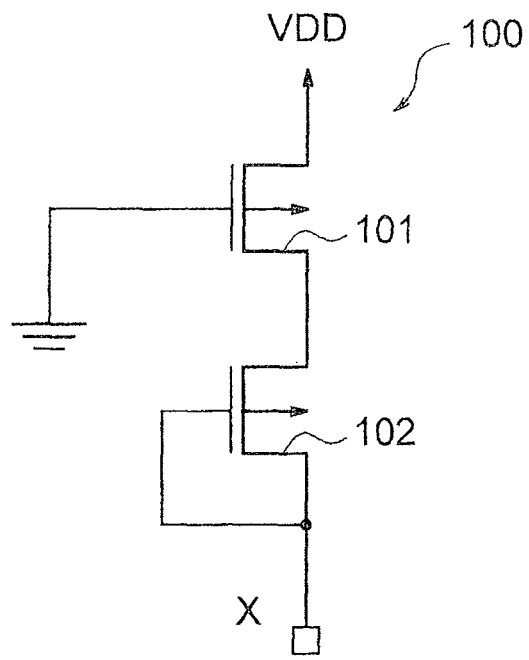
FIG. 12 is a circuit diagram illustrating a configuration of a pull-up circuit according to the first example embodiment.

FIG. 12 is a circuit diagram illustrating a configuration of a pull-up circuit 100 according to the first example embodiment.

The pull-up circuit 100 may include a PMOS transistor 101, and a PMOS transistor 102 that serves as a switching section.

The PMOS transistor 101 may have a source terminal coupled to the power supply VDD. The power supply VDD may have, for example but not limited to, 5 V. The PMOS transistor 101 may also have a gate terminal coupled to the ground, and a drain terminal coupled to a source terminal of the PMOS transistor 102.

The PMOS transistor 102 may have a gate terminal coupled to a drain terminal of the PMOS transistor 102 and a terminal X. The terminal X may be coupled to an STB terminal of the corresponding driver IC.

Figure 13:
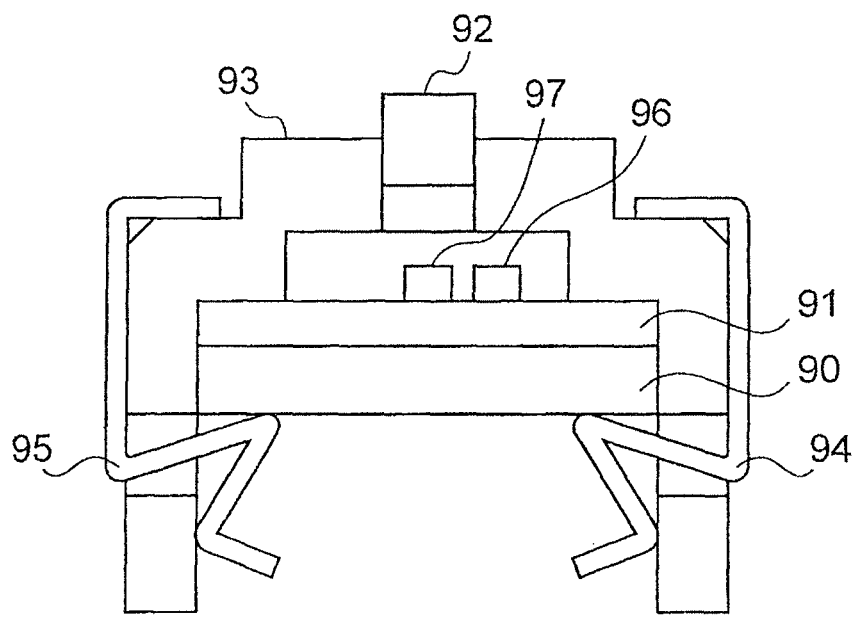
FIG. 13 is a cross-sectional diagram schematically illustrating a configuration of the LED head according to the first example embodiment.

FIG. 13 is a cross-sectional diagram schematically illustrating a configuration of the LED head 14.

The LED head 14 may include a base member 90, a printed wiring board 91, a rod lens array 92, a holder 93, and clamp members 94 and 95. The printed wiring board 91 may be fixed to the base member 90. The rod lens array 92 may have an array of cylindrical optical devices. The holder 93 may hold the rod lens array 92. The clamp members 94 and 95 may fix the base member 90, the printed wiring board 91, and the holder 93.

A reference numeral 96 denotes an IC chip in which the drive circuit described above and any other element may be integrated.

A reference numeral 97 denotes an LED array so disposed as to face the IC chip 96. Note that illustrations of a bonding wire that couples the IC chip 96 and the LED array 97 together and any other element are omitted in FIG. 13.

[Operation]

Figure 14:
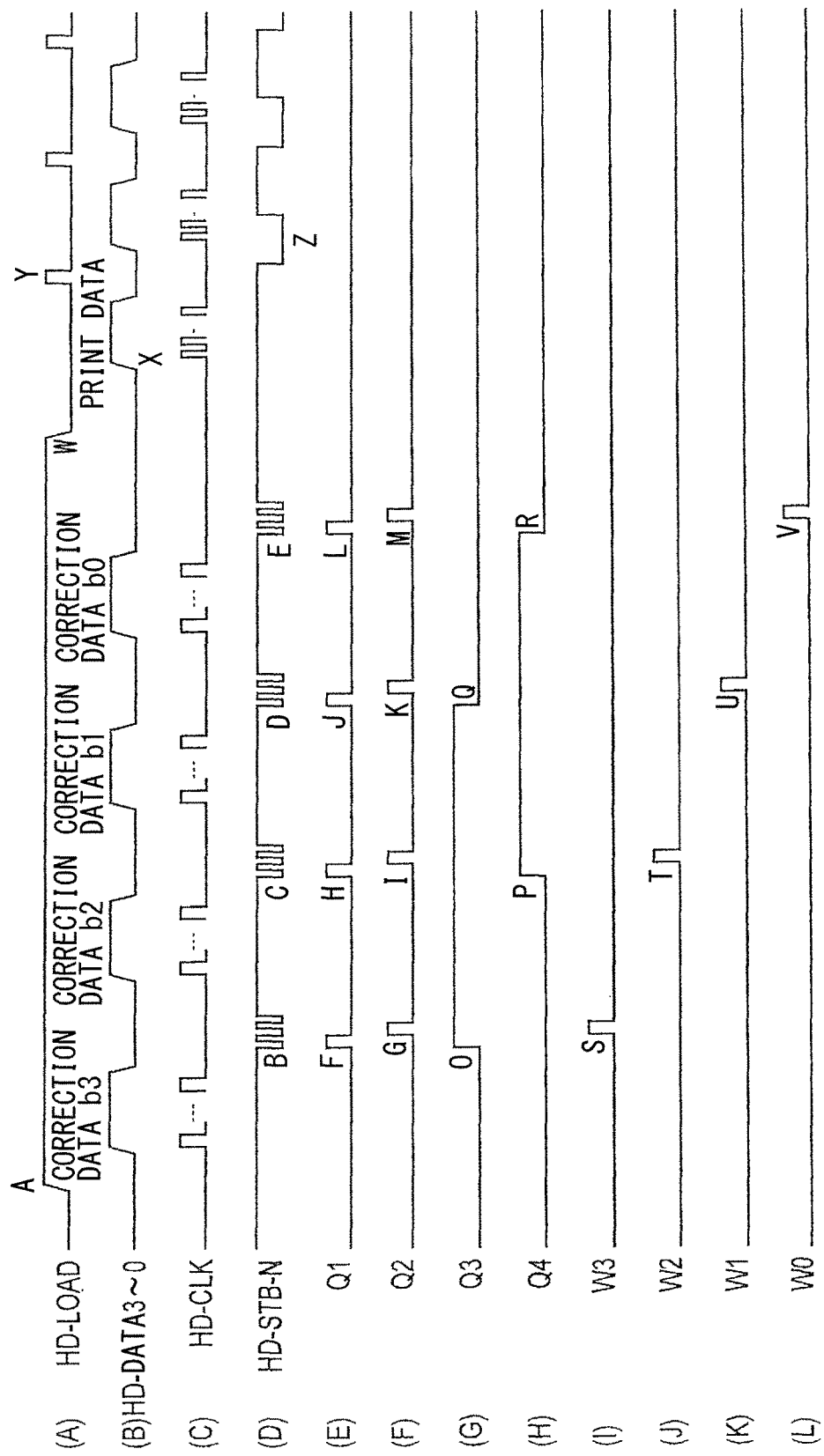
FIG. 14 is a time chart illustrating a forwarding process of correction data performed on the LED head after the electrophotographic printer is turned on, and a forwarding process of print data performed following the forwarding process of the correction data, according to the first example embodiment.

FIG. 14 is a time chart illustrating a forwarding process of the correction data performed on the LED head 14 after an electrophotographic printer is turned on, and a forwarding process of print data performed following the forwarding process of the correction data.

Referring to (A) of FIG. 14, the latch signal HD-LOAD to be supplied to the LED head 14 may be set to the high level prior to forwarding of the correction data to indicate that data to be forwarded is the correction data.

Referring to (B) of FIG. 14, among the pieces of correction data having 4 bits including the bit3 to bit0 per dot, the correction data corresponding to bit3 may be supplied, in synchronization with the clock signal HD-CLK illustrated in (C) of FIG. 14, to the LED head 14 through corresponding one of the signal lines of the print data signals HD-DATA3 to 0. These correction data signals may be supplied in a shift-input fashion to the shift registers formed by the flip-flop circuits FFA1 to FFD48 illustrated in FIGS. 3A and 3B.

A reference numeral Q1 in (E) of FIG. 14 denotes the Q output signal of the flip-flop circuit 60a illustrated in FIG. 6, and a reference numeral Q2 in (F) denotes the Q output signal of the flip-flop circuit 60b. Also, a reference numeral Q3 in (G) of FIG. 14 denotes the Q output signal of the flip-flop circuit 60d, and a reference numeral Q4 in (H) denotes the Q output signal of the flip-flop circuit 60c.

Signals denoted as respective reference numerals W3 to W0 in (I) to (L) of FIG. 14 may correspond to the output signals of the respective AND circuits 62a to 62d.

Upon supplying of a first pulse of the print drive signal HD-STB-N at a part B illustrated in (D) of FIG. 14, a signal Q1 may be generated as illustrated by a part F in (E) of FIG. 14. Further, a signal Q2 may be generated as illustrated by a part G in (F) of FIG. 14 upon supplying of a second pulse of the print drive signal HD-STB-N.

Also, upon rising of the signal Q1, a signal Q3 illustrated in (G) of FIG. 14 may be inverted to make a transition from, for example but not limited to, the low level to the high level as illustrated by a part O in (G) of FIG. 14.

As illustrated by a part A in (A) of FIG. 14, the reset terminals (R) of the respective flip-flop circuits 60a to 60d illustrated in FIG. 6 may be active when the latch signal HD-LOAD is at the low level, and the Q outputs of the respective flip-flop circuits 60a to 60d each may be at the low level.

The signals W3 to W0 may be generated following the signal Q2 as illustrated in (I) to (L) of FIG. 14, in output order of the W3 signal as illustrated by a part S in (I) of FIG. 14, the subsequent signal W2, the signal W1, and the signal W0.

Each time one of the pulse signals of the signals W3 to W0 is generated, writing of data into the MEM block as the memory circuit 30 illustrated in FIG. 4 may be carried out, and thereby writing of data into a memory device may be performed based on the pulse signals of the signals W3 to W0.

Upon completion of the data writing of all the bit3 to bit0 of the pieces of correction data following the example process described above, the latch signal HD-LOAD may make a transition from the high level to the low level as illustrated by a part Win (A) of FIG. 14, thereby allowing for forwarding of the print data.

Upon the transition of the latch signal HD-LOAD to the low level, the flip-flop circuits 60a to 60d illustrated in FIG. 6 may be subjected to reset, whereby the Q outputs thereof may make a transition to the low level again.

The print data may be forwarded at a part X illustrated in (B) of FIG. 14. The pieces of data supplied in a shift-input fashion to the shift registers (FFA1 to FFD1, . . . , FFA48 to FFD48) may be latched by the respective latch devices (LTA1 to LTD1, . . . , LTA48 to LTD48), based on the pulse of the latch signal HD-LOAD at a part Y illustrated in (A) of FIG. 14.

Further, the print drive signal HD-STB-N may make a transition from the high level to the low level as illustrated by a part Z in (D) of FIG. 14, whereby the light-emission drive of a corresponding LED element may be performed to turn on the LED during which the signal is at the low level.

The LED may be turned off upon returning of the print drive signal HD-STB-N to the high level.

Figure 15A:
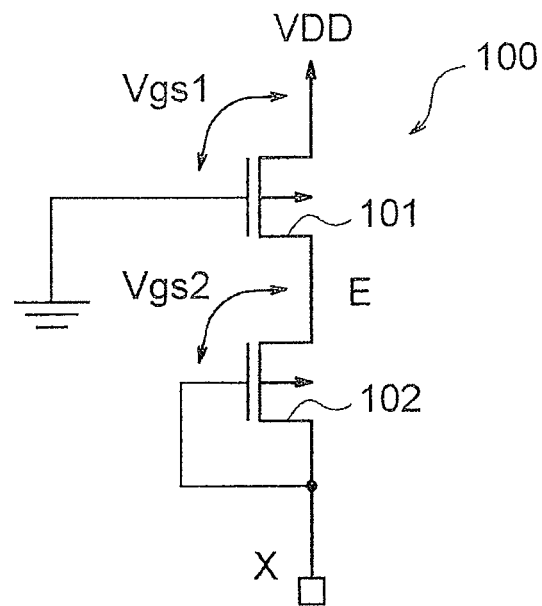
FIGS. 15A and 15B each schematically illustrate an operation of the pull-up circuit according to the first example embodiment.
Figure 15B:
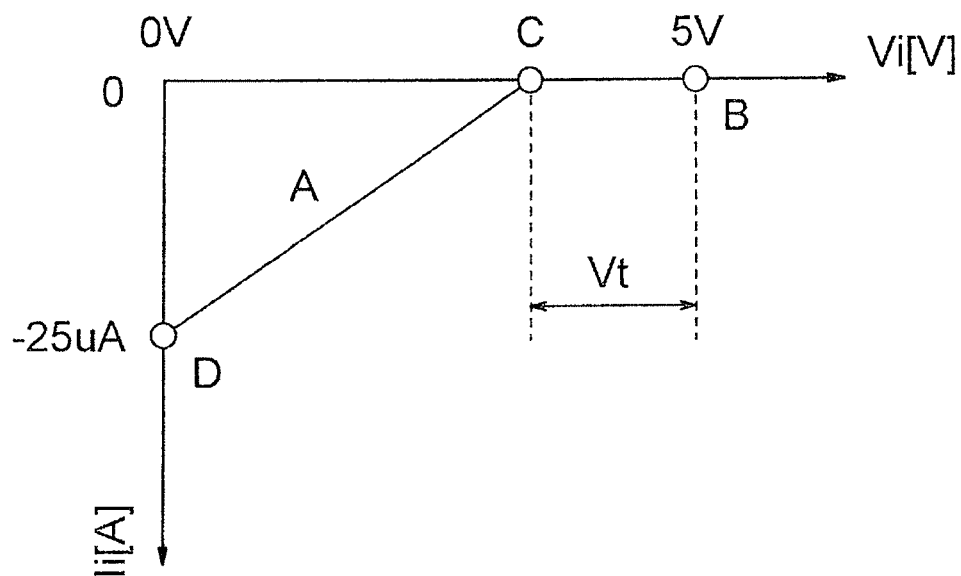

FIGS. 15A and 15B each schematically illustrate an operation of the pull-up circuit 100 according to the first example embodiment.

Referring to FIG. 15A, the PMOS transistor 101 may have the source terminal coupled to the power supply VDD. The power supply VDD may have a potential of 5 V by way of example. The PMOS transistor 101 may also have the gate terminal coupled to the ground, and have a gate-to-source voltage Vgs1 of, for example but not limited to, 5 V. As a result, when the PMOS transistor 101 is turned on, a potential at a point E in FIG. 15A is at 5 V which is substantially equal to the potential of the power supply VDD.

The PMOS transistor 102 may have the gate terminal coupled to the drain terminal of the PMOS transistor 102. The gate terminal and the drain terminal of the PMOS transistor 102 may be coupled to the terminal X. The PMOS transistor 102 may be turned on when a gate-to-source voltage Vgs2 of the PMOS transistor 102 is equal to or higher than a threshold voltage Vt, making it possible to flow a current to the drain terminal of the PMOS transistor 102.

FIG. 15B is a graph illustrating characteristics of the pull-up circuit 100, in which a horizontal axis represents a potential Vi [V] of the terminal X, whereas a vertical axis represents a current Ii [A] that flows out from the terminal X. Note that the current Ii has a minus value indicating that a direction of the current is based on outflow.

A point B on a characteristic line A of the graph represents a case where a potential of the terminal X is 5 V. In this case, a current of the terminal X is zero.

A point C is a point where the potential of the terminal X is decreased from 5V by an amount corresponding to the threshold voltage Vt. A current at the point C is about zero as well.

The current Ii in absolute value increases with a decrease in potential of the terminal X. The current Ii may have a current value of minus 25 µA in one example illustrated in FIG. 15B when the potential of the terminal X decreases down to a potential of 0 V as represented by a point D.

In one example illustrated in FIG. 15B, the threshold voltage Vt may be about 1.5 V, meaning that the potential Vi (the Vi voltage) at the point C may be 3.5 V which is derived from the subtraction of 1.5 V from the voltage at the point B of 5V.

In other words, the PMOS transistor 102 may function as the switching section that is turned on when a potential difference between the power supply VDD and the terminal X exceeds the threshold voltage Vt.

The threshold voltage Vt may preferably so satisfy the following expression (4) as to allow, for example but not limited to, the potential at the point C to be lower than the voltage of the power supply VDD of 5 V and equal to or higher than the voltage of 3.3 V as the potential of the power supply of an ASIC LSI in the printing control section 2.

$$0\ V < Vt \leq 1.7\ V \tag{4}$$

Figure 16:
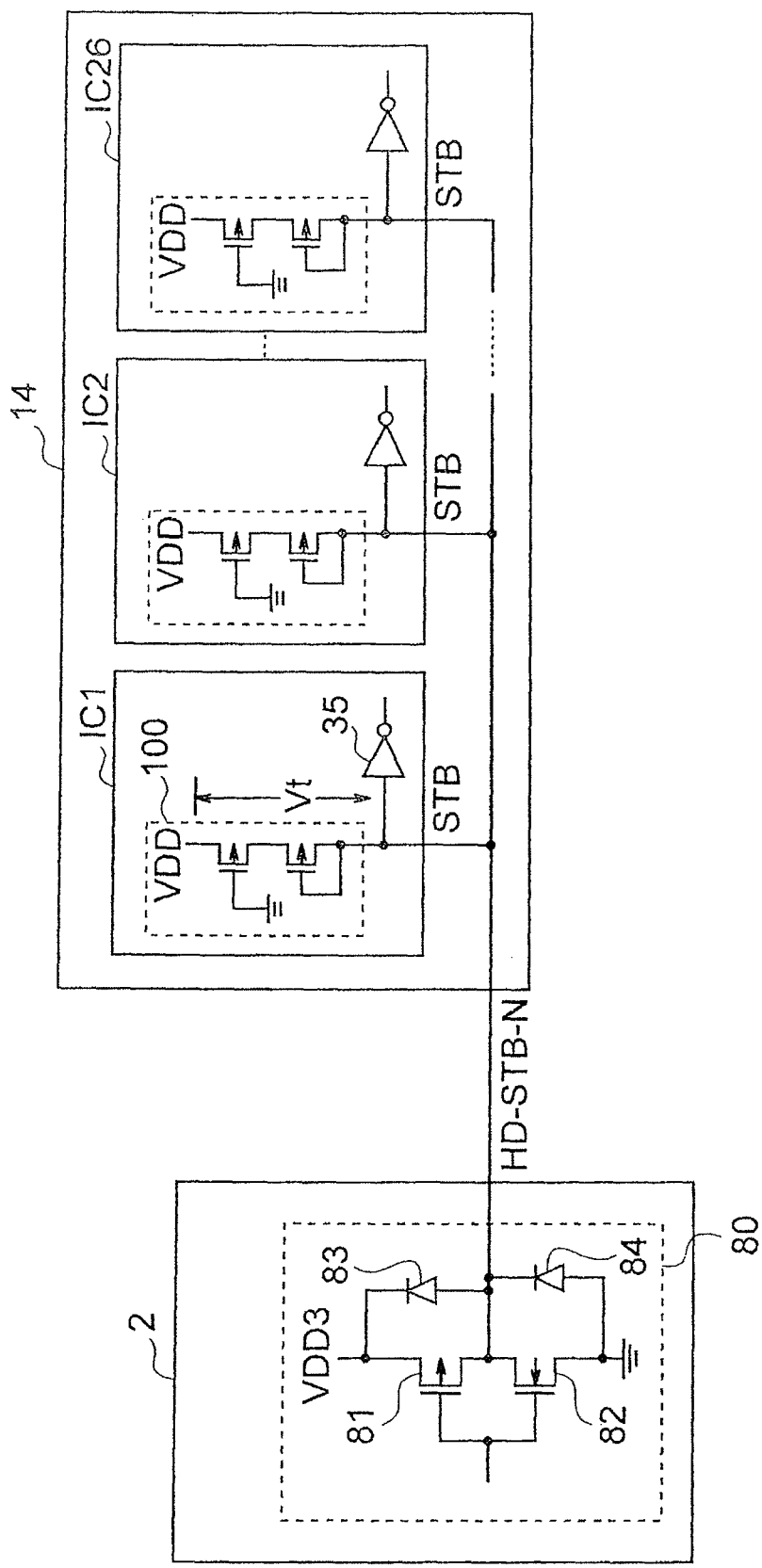
FIG. 16 schematically illustrates an operation of a printing control section and the LED head that uses the driver IC according to the first example embodiment.

FIG. 16 schematically illustrates an operation of the printing control section 2 and the LED head 14 that uses the driver IC according to the first example embodiment.

A reference numeral 80 denotes a key part of a signal output section of the ASIC LSI provided in the printing control section 2.

A reference numeral 81 denotes a PMOS transistor. A reference numeral 82 denotes an NMOS transistor. A reference numeral 83 denotes a parasitic diode that may be generated in association with the PMOS transistor 81. A reference numeral 84 denotes a parasitic diode that may be generated in association with the NMOS transistor 82.

The PMOS transistor 81 may have a source terminal coupled to a power supply VDD3. The power supply VDD3 may have a potential of 3.3 V by way of example.

The PMOS transistor 81 may have a drain terminal coupled to a drain terminal of the NMOS transistor 82. The NMOS transistor 82 may have a source terminal coupled to the ground. The PMOS transistor 81 and the NMOS transistor 82 each may have a gate terminal coupled to a terminal that supplies an internal signal generated by an unillustrated control circuit.

The PMOS transistor 81 and the NMOS transistor 82 may form a CMOS inverter circuit.

The parasitic diode 83 may have a cathode terminal coupled to the power supply VDD3, and an anode terminal coupled to STB terminals of the driver ICs.

The parasitic diode 84 may have an anode terminal coupled to the ground, and a cathode terminal coupled to the STB terminals of the driver ICs.

The LED head 14 may include the driver ICs (e.g., IC1 to IC26).

A reference numeral 100 denotes a pull-up circuit. The STB terminal of each of the driver ICs may be provided with the pull-up circuit 100.

A reference numeral 35 denotes an inverter circuit. The inverter circuit 35 may be coupled to an unillustrated internal circuit of the corresponding driver IC.

In a range in which the potential of the STB terminal of any driver IC is from 5 V (i.e., the VDD potential) to about 3.5 V (i.e., the VDD potential minus the Vt potential) as described above with reference to FIG. 15B, the current that flows out through the STB terminal from any pull-up circuit 100 is small to an ignorable extent.

Under such circumstances, the potential of the power supply VDD3 may be set to 3.3 V and a forward voltage of the parasitic diode 83 may be about 0.6 V by way of example. In such a situation, to generate a current attributed to the flow out from the STB terminal of any driver IC in a path that travels through the parasitic diode 83 to reach the power supply VDD3, it is necessary to for the print drive signal HD-STB-N to have a potential that is equal to or higher than 3.9 V, i.e., the potential of the power supply VDD3 of 3.3 V plus the forward voltage of the parasitic diode 83 of about 0.6 V.

However, an open voltage of the pull-up circuit 100 stays at about 3.5 V, preventing the forward current from being generated at the parasitic diode 83.

The latch-up breakage of a CMOS inverter may be generated as a result of the current that flows in the forward direction toward the parasitic diode 83 or 84 of the CMOS inverter. One configuration illustrated in FIG. 16 suppresses the generation of the forward current through the parasitic diode 83, preventing the occurrence of latch-up in the CMOS inverter circuit formed by the PMOS transistor 81 and the NMOS transistor 82.

The pull-up circuit 100 according to the foregoing first example embodiment therefore suppresses the generation of the latch-up breakage of a circuit including the ASIC LSI provided in the printing control section 2 even when the printing control section 2 has the supply voltage of, for example but not limited to, 3.3 V. Hence, it is possible to achieve an apparatus having superior reliability.

Also, the pull-up circuit 100 according to the foregoing first example embodiment eliminates the necessity to provide an additional element such as the buffer device and the buffer circuit 960. Hence, it is possible to prevent the latch-up breakage without increasing manufacturing costs.

Figure 17:
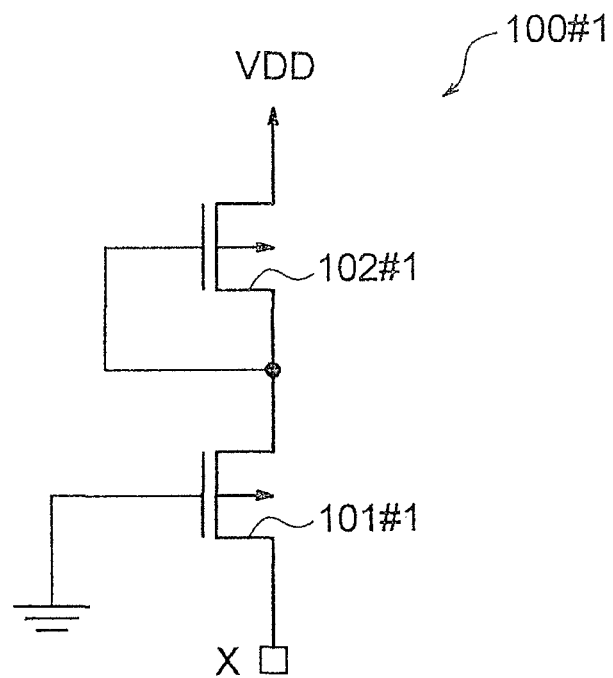
FIG. 17 is a circuit diagram illustrating a first modification example of the pull-up circuit according to the first example embodiment.

FIG. 17 is a circuit diagram illustrating a first modification example of the pull-up circuit 100 according to the first example embodiment.

A pull-up circuit 100#1 according to the first modification example may include a PMOS transistor 101#1 and a PMOS transistor 102#1 that serves as the switching section. The pull-up circuit 100#1 according to the first modification example differs from the pull-up circuit 100 according to the first example embodiment, in that positions of the PMOS transistor 101 and the PMOS transistor 102 in the configuration of the pull-up circuit 100 are reversed.

The PMOS transistor 102#1 may have a source terminal coupled to the power supply VDD, and a gate terminal coupled to a drain terminal of the PMOS transistor 102#1.

The PMOS transistor 101#1 may have a gate terminal coupled to the ground, and a source terminal coupled to the drain terminal of the PMOS transistor 102#1. The PMOS transistor 101#1 may have a drain terminal coupled to the terminal X.

Figure 18:
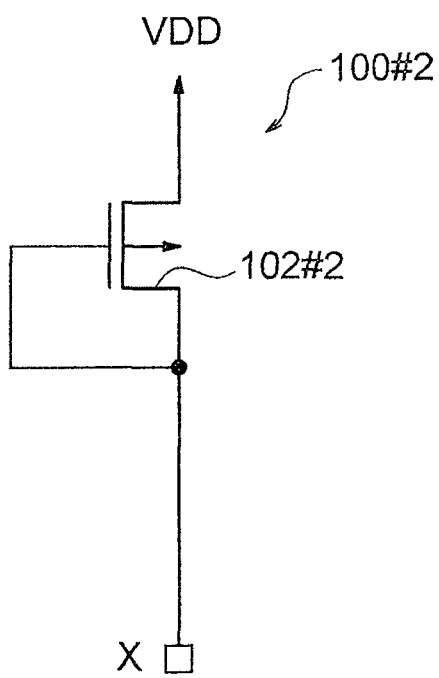
FIG. 18 is a circuit diagram illustrating a second modification example of the pull-up circuit according to the first example embodiment.

FIG. 18 is a circuit diagram illustrating a second modification example of the pull-up circuit 100 according to the first example embodiment.

A pull-up circuit 100#2 according to the second modification example may include a PMOS transistor 102#2 that serves as the switching section. The pull-up circuit 100#2 according to the second modification example differs from the pull-up circuit 100 according to the first example embodiment, in that the PMOS transistor 101 is removed from the configuration of the pull-up circuit 100.

The PMOS transistor 102#2 may have a source terminal coupled to the power supply VDD, and a gate terminal coupled to a drain terminal of the PMOS transistor 102#2 and the terminal X.

The foregoing first example embodiment utilizes, as a pull-up resistor, on-resistance of the PMOS transistor 101. The use of the on-resistance is illustrative and non-limiting; in an alternative embodiment, the pull-up resistor may be a resistor that utilizes impurity diffusion or a polysilicon material.

[Second Example Embodiment]
[Configuration]

A description is given next of a second example embodiment.

Referring to FIGS. 3A and 3B, the second example embodiment includes a pull-up circuit 200 instead of the pull-up circuit 100 according to the first example embodiment. Otherwise, the second example embodiment may be the same in configuration as the first example embodiment.

Figure 19:
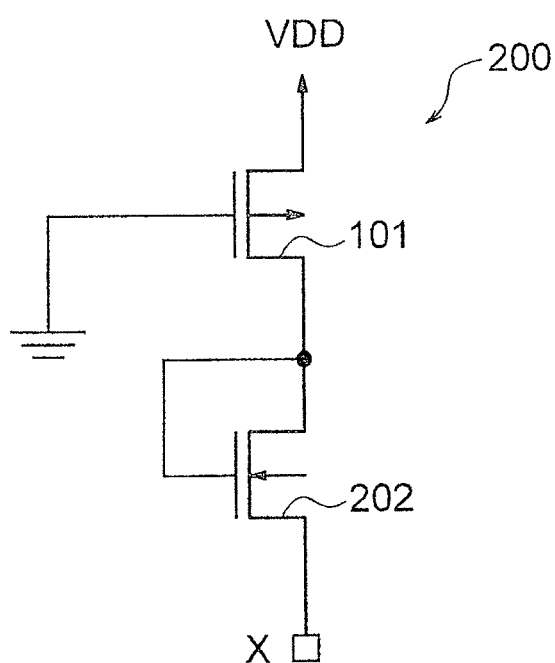
FIG. 19 is a circuit diagram illustrating a configuration of a pull-up circuit according to a second example embodiment.

FIG. 19 is a circuit diagram illustrating a configuration of the pull-up circuit 200 according to the second example embodiment.

The pull-up circuit 200 may include the PMOS transistor 101, and an NMOS transistor 202 that serves as the switching section. The PMOS transistor 101 may be the same as the PMOS transistor 101 of the pull-up circuit 100 according to the first example embodiment.

The PMOS transistor 101 may have the source terminal coupled to the power supply VDD. The power supply VDD may have, for example but not limited to, 5 V. The PMOS transistor 101 may also have the gate terminal coupled to the ground, and the drain terminal coupled to a drain terminal of the NMOS transistor 202.

The NMOS transistor 202 may have a gate terminal coupled to the drain terminal of the NMOS transistor 202 and the drain terminal of the PMOS transistor 101. The NMOS transistor 202 may have a source terminal coupled to the terminal X to be coupled to the STB terminal of the corresponding driver IC.

[Operation]

Figure 20A:
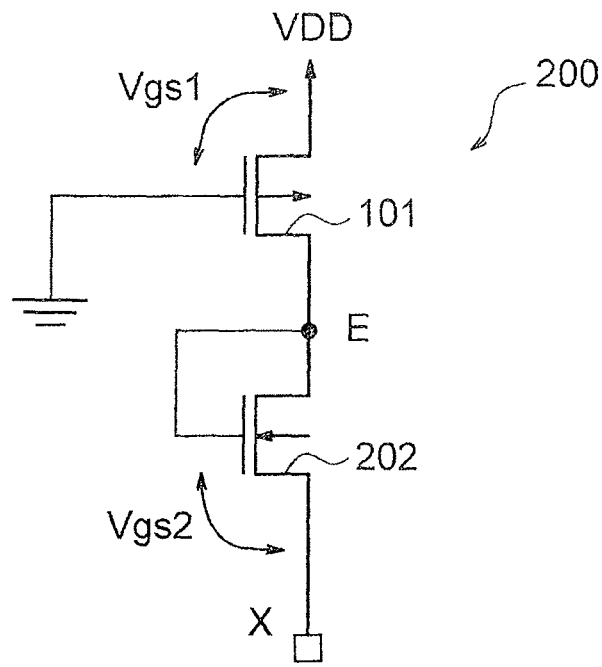
FIGS. 20A and 20B each schematically illustrate an operation of the pull-up circuit according to the second example embodiment.
Figure 20B:
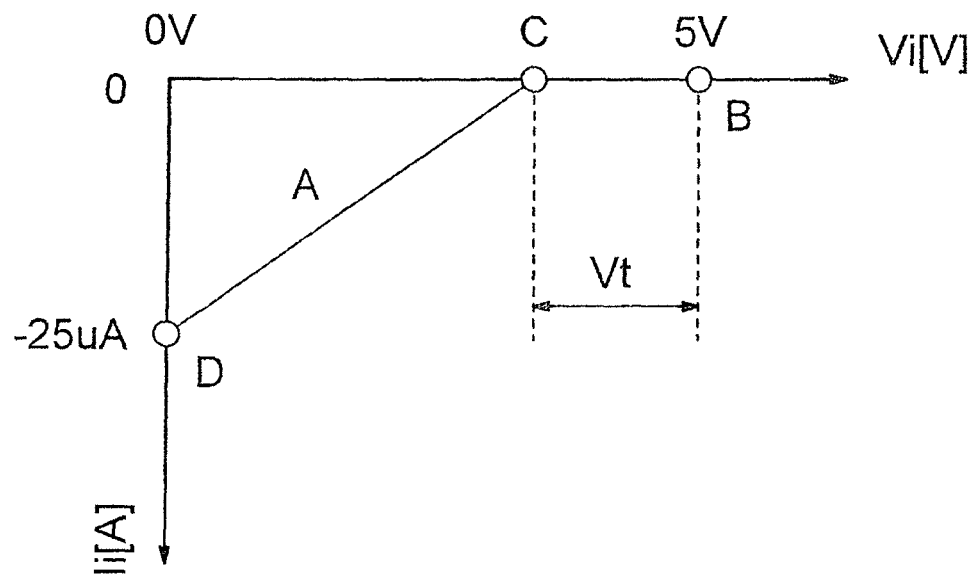

FIGS. 20A and 20B each schematically illustrate an operation of the pull-up circuit 200 according to the second example embodiment.

Referring to FIG. 20A, the PMOS transistor 101 may have the source terminal coupled to the power supply VDD. The power supply VDD may have the potential of 5 V by way of example. The PMOS transistor 101 may also have the gate terminal coupled to the ground, and have the gate-to-source voltage Vgs1 of, for example but not limited to, 5 V. As a result, when the PMOS transistor 101 is turned on, the potential at the point E in FIG. 20A is at 5 V which is substantially equal to the potential of the power supply VDD.

The NMOS transistor 202 may have the gate terminal coupled to the drain terminal of the NMOS transistor 202. The NMOS transistor 202 may be turned on when a gate-to-source voltage Vgs2 of the NMOS transistor 202 is equal to or higher than the threshold voltage Vt, making it possible to flow a current to the source terminal of the NMOS transistor 202.

FIG. 20B is a graph illustrating characteristics of the pull-up circuit 200 according to the second example embodiment, in which a horizontal axis represents a potential Vi [V] of the terminal X, whereas a vertical axis represents a current Ii [A] that flows out from the terminal X. Note that the current Ii has a minus value indicating that a direction of the current is based on outflow.

A point B on a characteristic line A of the graph represents a case where a potential of the terminal X is 5 V. In this case, a current of the terminal X is zero.

A point C is a point where the potential of the terminal X is decreased from 5V by an amount corresponding to the threshold voltage Vt. A current at the point C is about zero as well.

The current Ii in absolute value increases with a decrease in potential of the terminal X. The current Ii may have a current value of minus 25 µA in one example illustrated in FIG. 20B when the potential of the terminal X decreases down to a potential of 0 V as represented by a point D.

In one example illustrated in FIG. 20B, the threshold voltage Vt may be about 1.5 V, meaning that the Vi voltage at the point C may be 3.5 V which is derived from the subtraction of 1.5 V from the voltage at the point B of 5V.

The threshold voltage Vt in the second example embodiment may preferably be the same as the threshold voltage Vt according to the first example embodiment.

The pull-up circuit 200 according to the foregoing second example embodiment also suppresses the generation of the latch-up breakage of a circuit including the ASIC LSI provided in the printing control section 2 even when the printing control section 2 has the supply voltage of, for example but not limited to, 3.3 V. Hence, it is possible to achieve the apparatus having superior reliability.

Also, the pull-up circuit 200 according to the foregoing second example embodiment eliminates the necessity to provide an additional element such as the buffer device and the buffer circuit 960. Hence, it is possible to prevent the latch-up breakage without increasing manufacturing costs.

Figure 21:
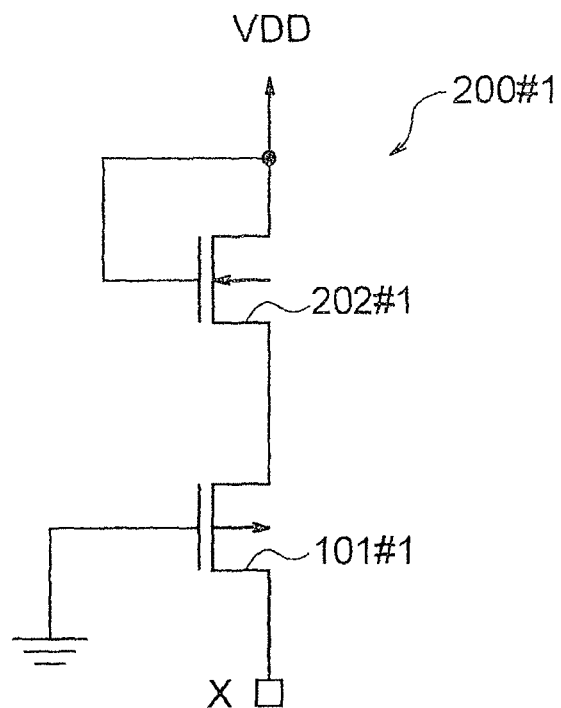
FIG. 21 is a circuit diagram illustrating a first modification example of the pull-up circuit according to the second example embodiment.

FIG. 21 is a circuit diagram illustrating a first modification example of the pull-up circuit 200 according to the second example embodiment.

A pull-up circuit 200#1 according to the first modification example of the second example embodiment may include the PMOS transistor 101#1 and an NMOS transistor 202#1 that serves as the switching section. The pull-up circuit 200#1 according to the first modification example differs from the pull-up circuit 200 according to the second example embodiment, in that positions of the PMOS transistor 101 and the NMOS transistor 202 in the configuration of the pull-up circuit 200 are reversed.

The NMOS transistor 202#1 may have a drain terminal coupled to the power supply VDD, and a gate terminal coupled to the drain terminal of the NMOS transistor 202#1. The NMOS transistor 202#1 may have a source terminal coupled to a source terminal of the PMOS transistor 101#1.

The PMOS transistor 101#1 may have a gate terminal coupled to the ground, and the drain terminal coupled to the terminal X.

Figure 22:
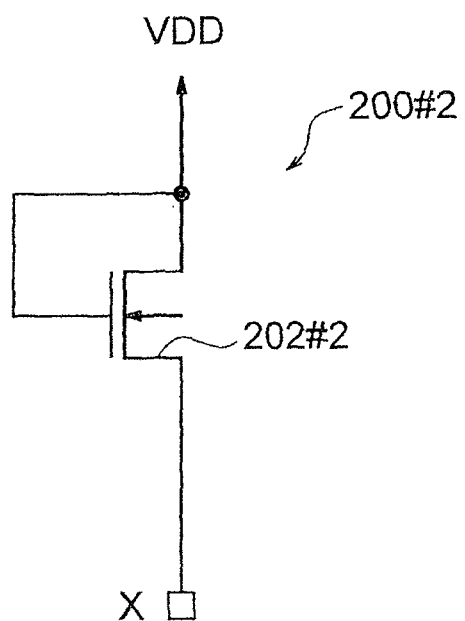
FIG. 22 is a circuit diagram illustrating a second modification example of the pull-up circuit according to the second example embodiment.

FIG. 22 is a circuit diagram illustrating a second modification example of the pull-up circuit 200 according to the second example embodiment.

A pull-up circuit 200#2 according to the second modification example of the second example embodiment may include an NMOS transistor 202#2 that serves as the switching section. The pull-up circuit 200#2 according to the second modification example differs from the pull-up circuit 200 according to the second example embodiment, in that the PMOS transistor 101 is removed from the configuration of the pull-up circuit 200.

The NMOS transistor 202#2 may have a drain terminal coupled to the power supply VDD, and a gate terminal coupled to a drain terminal of the NMOS transistor 202#2. The NMOS transistor 202#2 may have a source terminal coupled to the terminal X.

[Third Example Embodiment]

[Configuration]

A description is given next of a third example embodiment.

Referring to FIGS. 3A and 3B, the third example embodiment includes a pull-up circuit 300 instead of the pull-up circuit 100 according to the first example embodiment. Otherwise, the third example embodiment may be the same in configuration as the first example embodiment.

Figure 23:
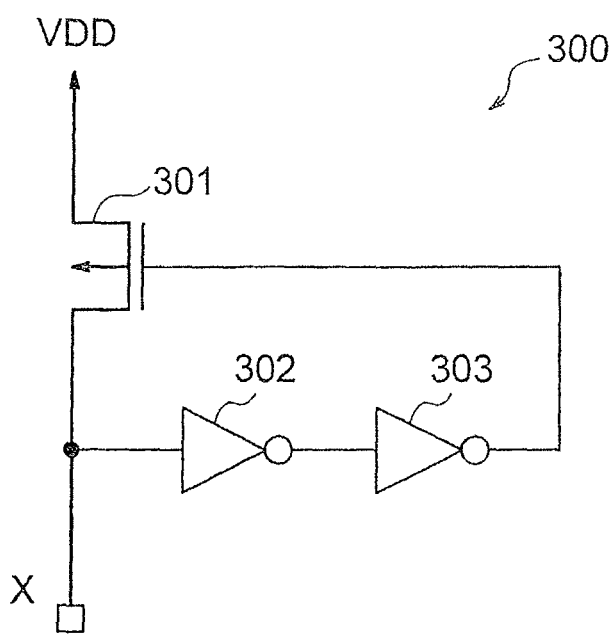
FIG. 23 is a circuit diagram illustrating a configuration of a pull-up circuit according to a third example embodiment.

FIG. 23 is a circuit diagram illustrating a configuration of the pull-up circuit 300 according to the third example embodiment.

The pull-up circuit 300 may include a PMOS transistor 301, and inverter circuits 302 and 303. In this example embodiment, the PMOS transistor 301 and the inverter circuits 302 and 303 may form the switching section.

The PMOS transistor 301 may have a source terminal coupled to the power supply VDD, and a drain terminal coupled to the terminal X. The power supply VDD may have a potential of 5 V by way of example.

The inverter circuit 302 may have an input terminal coupled to the terminal X, and an output terminal coupled to an input terminal of the inverter circuit 303.

The inverter circuit 303 may have an output terminal coupled to a gate terminal of the PMOS transistor 301.

The terminal X may be coupled to the STB terminal of the corresponding driver IC as illustrated in FIGS. 3A and 3B.

[Operation]

Figure 24A:
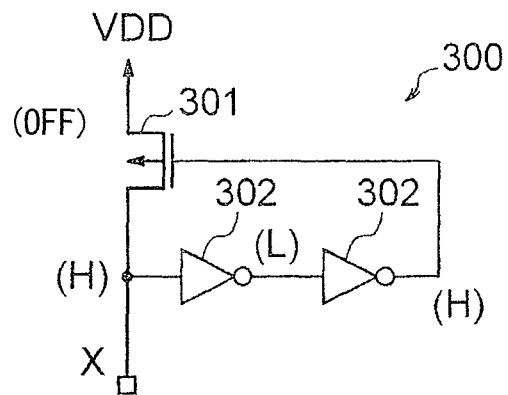
FIGS. 24A to 24C each schematically illustrate an operation of the pull-up circuit according to the third example embodiment.

FIGS. 24A to 20C each schematically illustrate an operation of the pull-up circuit 300 according to the third example embodiment.

FIG. 24A schematically illustrates an operation where the potential of the terminal X is at the high level. In FIG. 24A, (H) and (L) respectively denote the high level and the low level for potential levels of respective nodes.

The PMOS transistor 301 may be turned off when the potential of the terminal X is at the high level as illustrated in FIG. 24A, preventing the generation of current that flows out from the terminal X to the outside.

Figure 24B:
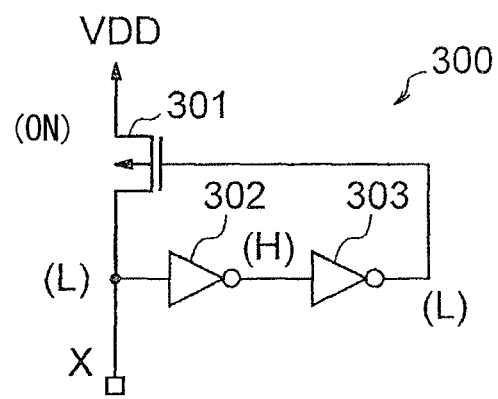

FIG. 24B schematically illustrates an operation where the potential of the terminal X is at the low level. In FIG. 24B, (H) and (L) respectively denote the high level and the low level for the potential levels of the respective nodes.

The PMOS transistor 301 may be turned on when the potential of the terminal X is at the low level as illustrated in FIG. 24B, increasing the potential of the terminal X toward the high level side and thereby making it possible to set the potential of the terminal X to the high level.

Figure 24C:
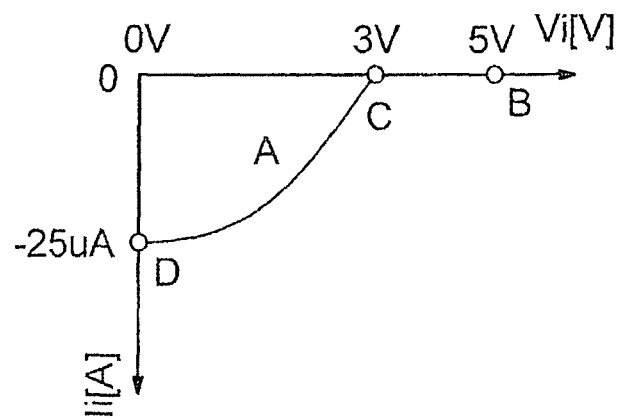

FIG. 24C is a graph illustrating characteristics of the pull-up circuit 300 according to the third example embodiment, in which a horizontal axis represents a potential Vi [V] of the terminal X, whereas a vertical axis represents a current Ii [A] that flows out from the terminal X. Note that the current Ii has a minus value indicating that a direction of the current is based on outflow.

A point B on a characteristic line A of the graph represents a case where a potential of the terminal X is 5 V. In this case, a current of the terminal X is zero.

A point C is a point where the potential of the terminal X is 3V by way of example. A current at the point C is about zero as well, and the potential at the point C may correspond to an open terminal voltage of the pull-up circuit 300.

The current Ii in absolute value increases with a decrease in potential of the terminal X. The current Ii may have a current value of minus 25 μA in one example illustrated in FIG. 24C when the potential of the terminal X decreases down to a potential of 0 V as represented by a point D.

In one example illustrated in FIG. 24C, a voltage of the potential Vi at the point C may correspond to an input threshold voltage of the inverter circuit 302 which may be 3 V by way of example. The input threshold voltage may be adjusted based on a size ratio of the PMOS and the NMOS transistors that form the inverter circuit 302. In this example embodiment, the input threshold voltage may be preferably set in a range from 2 V to 3 V.

Figure 25:
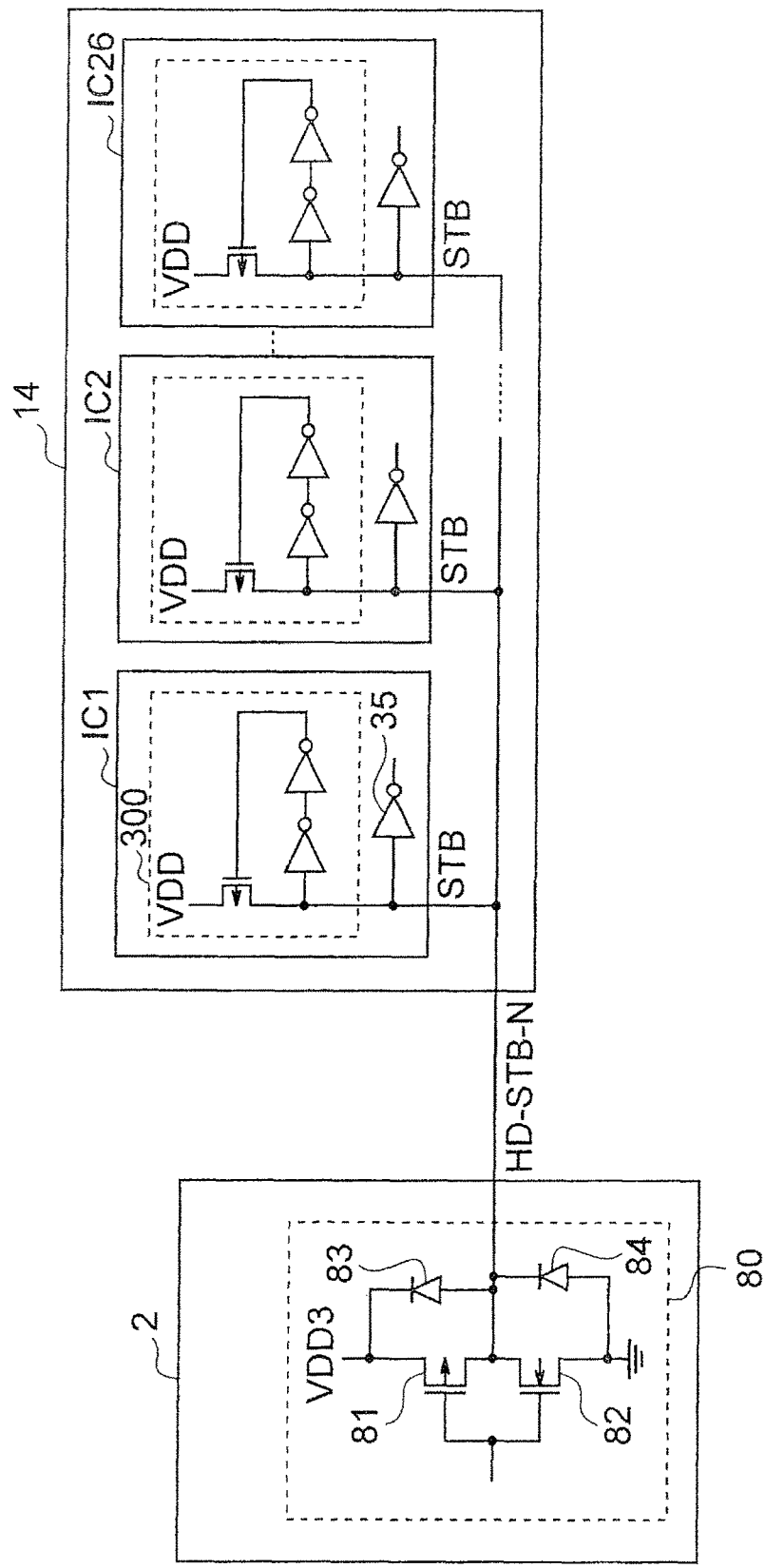
FIG. 25 schematically illustrates an operation of a printing control section and an LED head that uses the driver IC according to the third example embodiment.

FIG. 25 schematically illustrates an operation of the printing control section 2 and the LED head 14 that uses the driver IC according to the third example embodiment.

The printing control section 2 may have the same configuration as that of the printing control section 2 according to the first example embodiment illustrated in FIG. 16.

The LED head 14 may include the driver ICs (e.g., IC1 to IC26).

A reference numeral 300 denotes a pull-up circuit. The STB terminal of each of the driver ICs may be provided with the pull-up circuit 300.

A reference numeral 35 denotes the inverter circuit. The inverter circuit 35 may be coupled to an unillustrated internal circuit of the corresponding driver IC.

As described above with reference to FIG. 24C, the current that flows out through the STB terminal from any pull-up circuit 300 is small to an ignorable extent in a range in which the potential of the STB terminal of any driver IC is from 5 V (i.e., the VDD potential) to about 3 V (i.e., the Vcontrol potential). Under such circumstances, the potential of the power supply VDD3 may be set to 3.3 V and the forward voltage of the parasitic diode 83 may be about 0.6 V by way of example. In such a situation, to generate a current attributed to the flow out from the STB terminal of any driver IC in a path that travels through the parasitic diode 83 to reach the power supply VDD3, it is necessary for the print drive signal HD-STB-N to have the potential that is equal to or higher than 3.9 V, i.e., the potential of the power supply VDD3 of 3.3 V plus the forward voltage of the parasitic diode 83 of about 0.6 V.

However, an open voltage of the pull-up circuit 300 stays at about 3 V, preventing the forward current from being generated at the parasitic diode 83.

The latch-up breakage of a CMOS inverter may be generated as a result of the current that flows in the forward direction toward the parasitic diode 83 or 84 of the CMOS inverter. One configuration illustrated in FIG. 25 suppresses the generation of the forward current through the parasitic diode 83, preventing the occurrence of latch-up in the CMOS inverter circuit formed by the PMOS transistor 81 and the NMOS transistor 82.

Also, the pull-up circuit 300 according to the foregoing third example embodiment eliminates the necessity to provide an additional element such as the buffer device and the buffer circuit 960. Hence, it is possible to prevent the latch-up breakage without increasing manufacturing costs.

[Fourth Example Embodiment]
[Configuration]

A description is given next of a fourth example embodiment.

Referring to FIGS. 3A and 3B, the fourth example embodiment includes a pull-up circuit 400 instead of the pull-up circuit 100 according to the first example embodiment. Otherwise, the fourth example embodiment may be the same in configuration as the first example embodiment.

Figure 26:
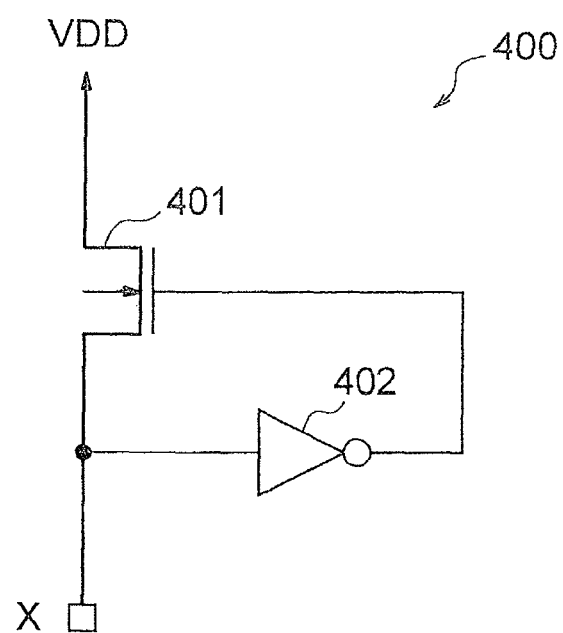
FIG. 26 is a circuit diagram illustrating a configuration of a pull-up circuit according to a fourth example embodiment.

FIG. 26 is a circuit diagram illustrating a configuration of the pull-up circuit 400 according to the fourth example embodiment.

The pull-up circuit 400 may include an NMOS transistor 401 and an inverter circuit 402. In this example embodiment, the NMOS transistor 401 and the inverter circuit 402 may form the switching section.

The NMOS transistor 401 may have a drain terminal coupled to the power supply VDD, and a source terminal coupled to the terminal X. The power supply VDD may have a potential of 5 V by way of example.

The inverter circuit 402 may have an input terminal coupled to the terminal X, and an output terminal coupled to a gate terminal of the NMOS transistor 401.

The terminal X may be coupled to the STB terminal of the corresponding driver IC as illustrated in FIGS. 3A and 3B.
[Operation]

Figure 27A:
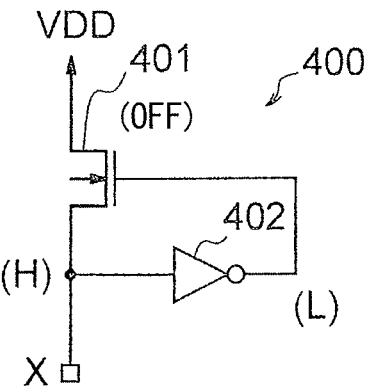
FIGS. 27A to 27C each schematically illustrate an operation of the pull-up circuit according to the fourth example embodiment.
Figure 27B:
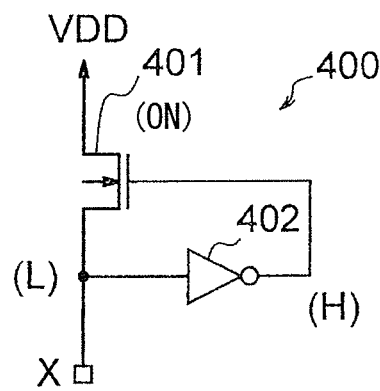
Figure 27C:
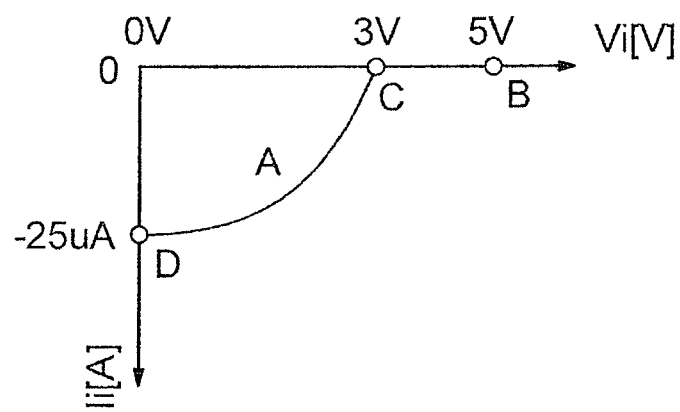

FIGS. 27A to 27C each schematically illustrate an operation of the pull-up circuit 400 according to the fourth example embodiment.

FIG. 27A schematically illustrates an operation where the potential of the terminal X is at the high level. In FIG. 27A, (H) and (L) respectively denote the high level and the low level for potential levels of respective nodes.

The NMOS transistor 401 may be turned off when the potential of the terminal X is at the high level as illustrated in FIG. 27A, preventing the generation of current that flows out from the terminal X to the outside.

FIG. 27B schematically illustrates an operation where the potential of the terminal X is at the low level. In FIG. 27B, (H) and (L) respectively denote the high level and the low level for the potential levels of the respective nodes.

The NMOS transistor 401 may be turned on when the potential of the terminal X is at the low level as illustrated in FIG. 27B, increasing the potential of the terminal X toward the high level side and thereby making it possible to set the potential of the terminal X to the high level.

FIG. 27C is a graph illustrating characteristics of the pull-up circuit 400 according to the fourth example embodiment, in which a horizontal axis represents a potential Vi [V] of the terminal X, whereas a vertical axis represents a current Ii [A] that flows out from the terminal X. Note that the current Ii has a minus value indicating that a direction of the current is based on outflow.

A point B on a characteristic line A of the graph represents a case where a potential of the terminal X is 5 V. In this case, a current of the terminal X is zero.

A point C is a point where the potential of the terminal X is 3V by way of example. A current at the point C is about zero as well, and the potential at the point C may correspond to an open terminal voltage of the pull-up circuit 400.

The current Ii in absolute value increases with a decrease in potential of the terminal X. The current Ii may have a current value of minus 25 μA in one example illustrated in FIG. 27C when the potential of the terminal X decreases down to a potential of 0 V as represented by a point D.

In one example illustrated in FIG. 27C, a voltage of the potential Vi at the point C may correspond to an input threshold voltage of the inverter circuit 402 which may be 3 V by way of example.

The input threshold voltage may be adjusted based on a size ratio of the PMOS and the NMOS transistors that form the inverter circuit 402. In this example embodiment, the input threshold voltage may be preferably set in a range from 2 V to 3 V.

The foregoing fourth example embodiment also suppresses the generation of the latch-up breakage of a circuit including the ASIC LSI provided in the printing control section 2 even when the printing control section 2 has the supply voltage of, for example but not limited to, 3.3 V. Hence, it is possible to achieve the apparatus having superior reliability.

Also, the foregoing fourth example embodiment eliminates the necessity to provide an additional element such as the buffer device and the buffer circuit 960. Hence, it is possible to prevent the latch-up breakage without increasing manufacturing costs.

The light-emitting element array described in each of the first to fourth example embodiments and their modification examples may be used as a light source directed to an exposure process of an electrophotographic printer. In the following, a description is given with reference to FIG. 28 of a tandem color printer as a non-limiting example of the electrophotographic printer.

Figure 28:
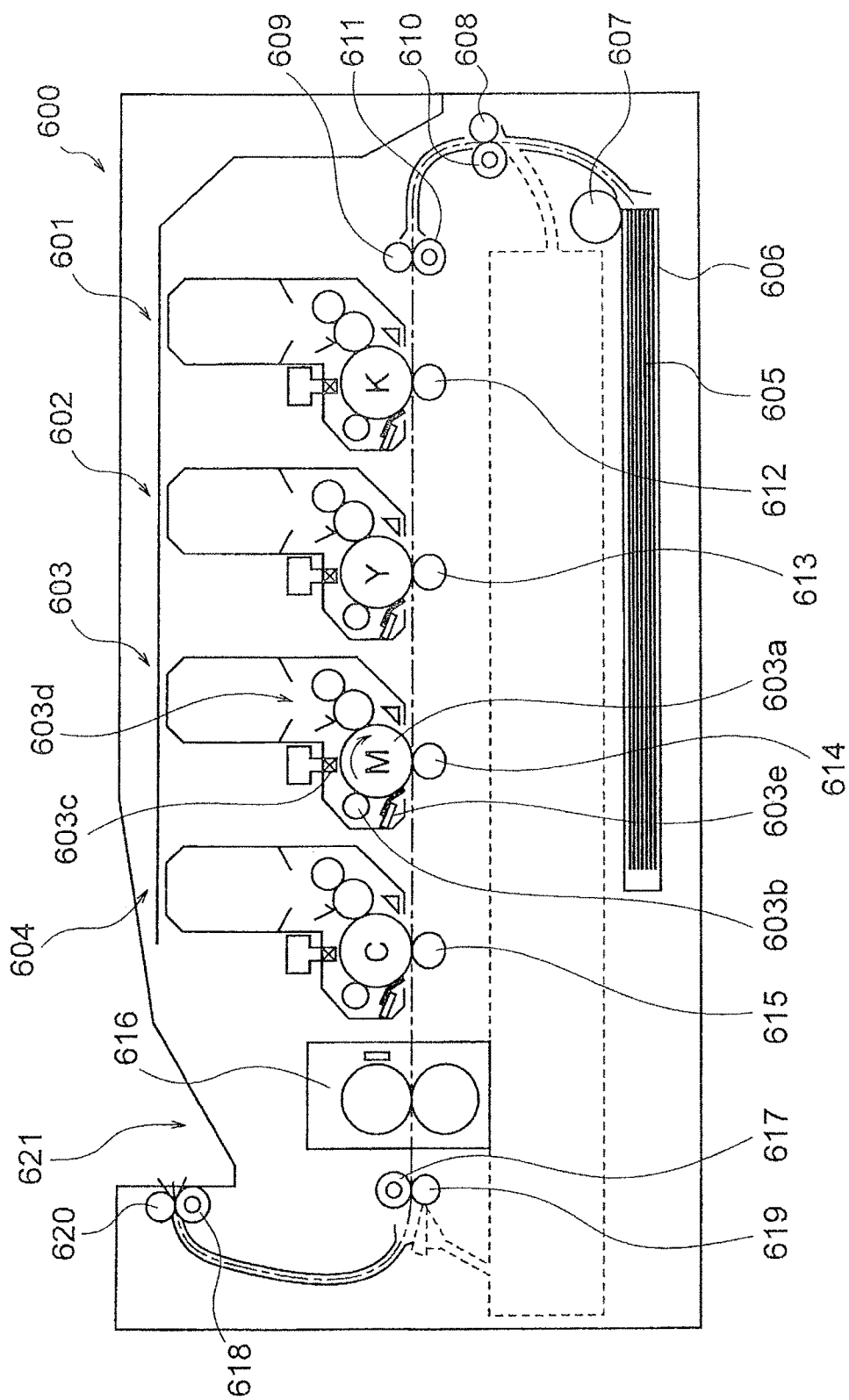
FIG. 28 is a schematic cross-sectional diagram illustrating an image forming apparatus that uses the LED head mounted with a semiconductor composite device according to any of the first to fourth example embodiments.

FIG. 28 is a schematic cross-sectional diagram illustrating an image forming apparatus 600 that uses the LED head 14 mounted with the semiconductor composite device according to any of the first to fourth example embodiments and their modification examples.

Referring to FIG. 28, the image forming apparatus 600 may include four process units 601, 602, 603, and 604 that may be provided along a conveying path of a recording medium 605 in order from upstream side of the conveying path. The process units 601 to 604 may respectively form a black (K) image, a yellow (Y) image, a magenta (M) image, and a cyan (C) image. These process units 601 to 604 may have the same internal configuration as each other; hence, a description is given with reference to an example of the magenta process unit 603 to describe the internal configurations of the process units 601 to 604.

The process unit 603 may include a photosensitive drum 603*a* that serves as an image supporting member. The photosensitive drum 603*a* may be disposed rotatably in a direction denoted by an arrow.

A charging unit 603*b* and an exposure unit 603*c* may be disposed at a surrounding part of the photosensitive drum 603*a*, and may be provided in order from upstream side in the direction of rotation of the photosensitive drum 603*a*. The charging unit 603*b* may supply a surface of the photosensitive drum 603*a* with electric charges to charge the surface of the photosensitive drum 603*a*. The exposure unit 603*c* may selectively irradiate the charged surface of the photosensitive drum 603*a* with light to form an electrostatic latent image. Any LED head 14 described above may be used as the exposure unit 603*c*.

The surrounding part of the photosensitive drum 603*a* may be further provided with a developing unit 603*d* and a cleaning unit 603*e*. The developing unit 603*d* may attach a toner having a predetermined color (magenta in this case) onto the surface of the photosensitive drum 603*a* on which the electrostatic latent image is formed to form a developed image. The cleaning unit 603*e* may remove the toner that remains on the surface of the photosensitive drum 603*a* upon transferring the developed image of the toner formed on the photosensitive drum 603*a*. The drum or a roller used in each of those units may be rotated as a result of transmission of drive force supplied from an unillustrated drive source through elements such as gears.

The image forming apparatus 600 may include a medium cassette 606 and a hopping roller 607. The medium cassette 606 may be attached at a lower part of the image forming apparatus 600, and store the recording medium 605 in a stacked fashion. The recording medium 605 may be, for example but not limited to, paper. The hopping roller 607 may be provided above the medium cassette 606, and adapted to convey the recording medium 605 one by one in a separated fashion. Downstream of the hopping roller 607 in the conveying direction of the recording medium 605 may be a convey roller 610 and a resist roller 611. The convey roller 610 may pinch the recording medium 605 in conjunction with a pinch roller 608 to convey the recording medium 605, whereas the resist roller 611 may pinch the recording medium 605 in conjunction with a pinch roller 609 to convey the recording medium 605 to the process unit 601 while correcting a skew of the recording medium 605. The hopping roller 607, the convey roller 610, and the resist roller 611 may be rotated as a result of transmission of drive force supplied from an unillustrated drive source through elements such as gears.

Transfer rollers 612, 613, 614, and 615 each may be disposed at a position that faces corresponding one of the photosensitive drums of the respective process units 601 to 604. Each of the transfer rollers 612 to 615 may be made of a semi-conductive rubber or any other suitable material. The transfer rollers 612 and 615 may be so applied with respective potentials that potential differences are provided between the surfaces of the photosensitive drums and surfaces of the transfer rollers 612 to 615 upon transferring, onto the recording medium 605, the developed images of the toners attached to the respective photosensitive drums.

A fixing unit 616 may include a heating roller and a backup roller, and may apply pressure and heat to the toners having been transferred onto the recording medium 605 to fix the toners thereto. Discharge rollers 617 and 618 may be provided downstream of the fixing unit 616. The discharge rollers 617 and 618 each may pinch the recording medium 605 fed from the fixing unit 616 in conjunction with corresponding one of pinch rollers 619 and 620 provided in a discharge section to convey the recording medium 605 to a recording medium stacker 621. Elements including the fixing unit 616 and the discharge rollers 617 and 618 may be rotated as a result of transmission of drive force supplied from an unillustrated drive source through elements such as gears.

Next, a description is given of an operation of the image forming apparatus 600 having the foregoing example configuration.

The recording medium 605 stored in a stacked fashion in the medium cassette 606 may be conveyed one by one from the top in a separated fashion by the hopping roller 607. The recording medium 605 fed from the medium cassette 606 may then be pinched by a combination of the convey roller 610 and the pinch roller 608 and a combination of the resist roller 611 and the pinch roller 609 to be conveyed to a region between the photosensitive drum of the process unit 601 and the transfer roller 612. The recording medium 605 may then be pinched by the photosensitive drum and the transfer roller 612, causing a toner image to be transferred onto a recording surface of the recording medium 605 while conveying the recording medium 605 by means of the rotation of the photosensitive drum.

Likewise, the recording medium 605 may pass through the process units 602 to 604 sequentially. During the course of passing through the process units 601 to 604, the toner images of respective colors may be overlaid onto the recording surface of the recording medium 605 to be transferred onto the recording surface sequentially. The toner images of the respective colors here may be obtained as a result of development performed by the developing units of the electrostatic latent images formed by the respective exposure units.

After the toner images of respective colors are overlaid onto the recording surface of the recording medium 605, the toner images may be fixed by the fixing unit 616. The recording medium 605, to which the toner images have been fixed by the fixing unit 616, may then be pinched by the discharge rollers 617 and 618 and the pinch rollers 619 and 620 to be discharged to the recording medium stacker 621 located outside of the image forming apparatus 600. A color image may thus be formed on the recording medium 605 following an example process described above.

The foregoing first to the fourth example embodiments and their modification examples each therefore makes it possible to provide the image forming apparatus 600 having superior space efficiency and light-extraction efficiency owing to the LED head 14. The image forming apparatus 600 may be, for example but not limited to, a printer, a copying machine, or any other instrument that forms an image on a medium. Note that the use of LED head 14 according to any of the first to the fourth example embodiments and their modification examples makes it possible to achieve example effects described above also in an monochrome image forming apparatus or a multi-color image forming apparatus, besides the full-color image forming apparatus 600 described above. The first to the fourth example embodiments and their modification examples, however, may be greatly effective especially for the full-color image forming apparatus that requires many exposure units.

The first to the fourth example embodiments and their modification examples have been described with reference to an application to the light-emitting elements, i.e., to the LEDs used as a light source. The invention, however, is not limited thereto. Embodiments of the invention are each applicable to any other driven element. For example, embodiments of the invention may be applied to a voltage application control performed on an organic electroluminescence (EL) element or a heat element. As one embodiment, any of embodiments of the invention may be applied to a printer provided with an organic EL head that includes an array of organic EL elements, or to a thermal printer that includes a line of heat elements.

Further, embodiments of the invention are each applicable to driving of display elements. In one embodiment, the driving may be performed on the display elements arrayed in line or in matrix. Also, embodiments of the invention are each applicable to driving of a light-emitting thyristor having a three-terminal structure, a four-terminal thyristor SCS (Silicon Semiconductor Controlled Switch) having two gate terminals including a first gate terminal and a second gate terminal, or any other suitable device to be driven, besides a driven element having a two-terminal structure such as, but not limited to, an LED.

Moreover, as can be readily appreciated from an inventive concept of the invention, embodiments of the invention are not limited to a drive circuit including a line of driven elements as a continuous arrangement of identical components. Embodiments of the invention are obviously applicable widely to an IC chip having any configuration and provided with one or a plurality of drive output terminals.

Furthermore, the invention encompasses any possible combination of some or all of the various embodiments and the modification examples described herein and incorporated herein.

It is possible to achieve at least the following configurations from the above-described example embodiments of the invention.

(1) A light-emission drive circuit, including:
a power supply configured to generate a voltage that is higher than a voltage in a controller, the controller being configured to supply a control signal that drives a light-emitting section; and
a pull-up circuit provided between the power supply and an input terminal of the light-emission drive circuit, and including a switching section configured to be turned on when a voltage of the input terminal is lower than a predetermined voltage, the predetermined voltage being lower than the voltage of the power supply.

(2) The light-emission drive circuit according to (1), wherein the predetermined voltage is equal to or higher than the voltage in the controller and lower than the voltage of the power supply.

(3) The light-emission drive circuit according to (1) or (2), wherein the switching section is a PMOS transistor having a source terminal coupled to the power supply, a gate terminal coupled to a drain terminal of the PMOS transistor, and the drain terminal coupled to the input terminal.

(4) The light-emission drive circuit according to (1) or (2), wherein
the pull-up circuit includes a first PMOS transistor having a source terminal coupled to the power supply, and a gate terminal coupled to ground, and
the switching section is a second PMOS transistor having a source terminal coupled to a drain terminal of the first PMOS transistor, a gate terminal coupled to a drain terminal of the second PMOS transistor, and the drain terminal coupled to the input terminal.

(5) The light-emission drive circuit according to (1) or (2), wherein
the switching section is a first PMOS transistor having a source terminal coupled to the power supply, and a gate terminal coupled to a drain terminal of the first PMOS transistor; and the pull-up circuit includes a second PMOS transistor having a source terminal coupled to the drain terminal of the first PMOS transistor, a gate terminal coupled to ground, and a drain terminal coupled to the input terminal.
(6) The light-emission drive circuit according to (1) or (2), wherein the switching section is an NMOS transistor having a drain terminal coupled to the power supply, a gate terminal coupled to the drain terminal of the NMOS transistor, and a source terminal coupled to the input terminal.
(7) The light-emission drive circuit according to (1) or (2), wherein
the pull-up circuit includes a PMOS transistor having a source terminal coupled to the power supply, and a gate terminal coupled to ground, and
the switching section is an NMOS transistor having a drain terminal coupled to a drain terminal of the PMOS transistor, a gate terminal coupled to the drain terminal of the NMOS transistor, and a source terminal coupled to the input terminal.
(8) The light-emission drive circuit according to (1) or (2), wherein
the switching section is an NMOS transistor having a drain terminal coupled to the power supply, and a gate terminal coupled to the drain terminal of the NMOS transistor; and
the pull-up circuit includes a PMOS transistor having a source terminal coupled to a source terminal of the NMOS transistor, a gate terminal coupled to ground, and a drain terminal coupled to the input terminal.
(9) The light-emission drive circuit according to (1), wherein the predetermined voltage is equal to or lower than the voltage in the controller.
(10) The light-emission drive circuit according to any one of (1) to (9), wherein the switching section includes:
a first inverter circuit having an input terminal coupled to the input terminal of the light-emission drive circuit;
a second inverter circuit having an input terminal coupled to an output terminal of the first inverter circuit; and
a PMOS transistor having a source terminal coupled to the power supply, a gate terminal coupled to an output terminal of the second inverter circuit, and a drain terminal coupled to the input terminal of the light-emission drive circuit.
(11) The light-emission drive circuit according to any one of (1) to (9), wherein the switching section includes:
an inverter circuit having an input terminal coupled to the input terminal of the light-emission drive circuit; and
an NMOS transistor having a drain terminal coupled to the power supply, a gate terminal coupled to an output terminal of the inverter circuit, and a source terminal coupled to the input terminal of the light-emission drive circuit.
(12) An image forming apparatus, including the light-emission drive circuit according to any one of (1) to (11).

Although the invention has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. A light-emission drive circuit that drives a light-emitting section, the light-emission drive circuit comprising:
a power supply terminal configured to receive a first power supply voltage that is higher than a second power supply voltage used in a controller;
an input terminal coupled directly to the controller and configured to receive a control signal from the controller; and
a pull-up circuit provided between the power supply terminal and the input terminal of the light-emission drive circuit, and including a switching section configured to be turned on when a voltage of the input terminal is lower than a predetermined voltage, on a basis of the voltage of the input terminal, the predetermined voltage being lower than the first power supply voltage.

2. The light-emission drive circuit according to claim 1, wherein the predetermined voltage is equal to or higher than the second power supply voltage and lower than the first power supply voltage.

3. The light-emission drive circuit according to claim 1, wherein the switching section comprises a PMOS transistor having a source terminal coupled to the power supply terminal, a gate terminal coupled to a drain terminal of the PMOS transistor, and the drain terminal coupled to the input terminal.

4. The light-emission drive circuit according to claim 1, wherein the pull-up circuit further includes, in addition to the switching section, a first PMOS transistor having a source terminal coupled to the power supply terminal, and a gate terminal coupled to ground, and
the switching section comprises a second PMOS transistor having a source terminal coupled to a drain terminal of the first PMOS transistor, a gate terminal coupled to a drain terminal of the second PMOS transistor, and the drain terminal coupled to the input terminal.

5. The light-emission drive circuit according to claim 1, wherein the switching section comprises a first PMOS transistor having a source terminal coupled to the power supply terminal, and a gate terminal coupled to a drain terminal of the first PMOS transistor; and
the pull-up circuit further includes, in addition to the switching section, a second PMOS transistor having a source terminal coupled to the drain terminal of the first PMOS transistor, a gate terminal coupled to ground, and a drain terminal coupled to the input terminal.

6. The light-emission drive circuit according to claim 1, wherein the switching section comprises an NMOS transistor having a drain terminal coupled to the power supply terminal, a gate terminal coupled to the drain terminal of the NMOS transistor, and a source terminal coupled to the input terminal.

7. The light-emission drive circuit according to claim 1, wherein the pull-up circuit further includes, in addition to the switching section, a PMOS transistor having a source terminal coupled to the power supply terminal, and a gate terminal coupled to ground, and the switching section comprises an NMOS transistor having a drain terminal coupled to a drain terminal of the PMOS transistor, a gate terminal coupled to the drain terminal of the NMOS transistor, and a source terminal coupled to the input terminal.

8. The light-emission drive circuit according to claim 1, wherein the switching section comprises an NMOS transistor having a drain terminal coupled to the power supply terminal, and a gate terminal coupled to the drain terminal of the NMOS transistor; and the pull-up circuit further includes, in addition to the switching section, a PMOS transistor having a source terminal coupled to a source terminal of the NMOS transistor, a gate terminal coupled to ground, and a drain terminal coupled to the input terminal.

9. The light-emission drive circuit according to claim 1, wherein the predetermined voltage is equal to or lower than the second power supply voltage.

10. The light-emission drive circuit according to claim 1, wherein the switching section includes:

a first inverter circuit having an input terminal coupled to the input terminal of the light-emission drive circuit;

a second inverter circuit having an input terminal coupled to an output terminal of the first inverter circuit; and a PMOS transistor having a source terminal coupled to the power supply terminal, a gate terminal coupled to an output terminal of the second inverter circuit, and a drain terminal coupled to the input terminal of the light-emission drive circuit.

11. The light-emission drive circuit according to claim 1, wherein the switching section includes:

an inverter circuit having an input terminal coupled to the input terminal of the light-emission drive circuit; and an NMOS transistor having a drain terminal coupled to the power supply terminal, a gate terminal coupled to an output terminal of the inverter circuit, and a source terminal coupled to the input terminal of the light-emission drive circuit.

12. An image forming apparatus provided with a light-emission drive circuit that drives a light-emitting section, the light-emission drive circuit comprising:

a power supply terminal configured to receive a first power supply voltage that is higher than a second power supply voltage used in a controller;

an input terminal coupled directly to the controller, and configured to receive a control signal from the controller; and a pull-up circuit provided between the power supply terminal and the input terminal of the light-emission drive circuit, and including a switching section configured to be turned on when a voltage of the input terminal is lower than a predetermined voltage, on a basis of the voltage of the input terminal, the predetermined voltage being lower than the first power supply voltage.

13. The image forming apparatus according to claim 12, further comprising:

the controller;

the light-emitting section;

a power supply configured to generate the first power supply voltage; and a process unit including a photosensitive member, and configured to form an image, the photosensitive member being configured to receive light emitted from the light-emitting section.

14. The image forming apparatus according to claim 12, wherein the light-emitting section includes a plurality of light-emitting elements, the controller supplies the light-emission drive circuit with correction data that corrects a light amount of each of the light-emitting elements, and the light-emission drive circuit further includes a memory that stores the correction data.

15. The image forming apparatus according to claim 14, wherein the light-emission drive circuit includes a plurality of drive transistors each configured to supply corresponding one of the light-emitting elements with a drive current, and the light-emission drive circuit corrects the light amount of the corresponding one of the light-emitting elements by selectively driving the drive transistors on a basis of the correction data stored in the memory.

16. The image forming apparatus according to claim 15, wherein the light-emission drive circuit further includes a control voltage generating circuit configured to generate, on a basis of the correction data stored in the memory, a voltage that turns on each of the drive transistors.

17. The image forming apparatus according to claim 12, wherein the light-emitting section includes a plurality of light-emitting elements, the controller supplies the light-emission drive circuit with bit data and a drive signal, and the light-emission drive circuit receives, as the control signal, the drive signal through the input terminal, and causes, on a basis of the bit data, the light-emitting elements to emit light in a period in which the drive signal is at a low level.

* * * * *